United States Patent
Ono et al.

(10) Patent No.: US 10,964,045 B2
(45) Date of Patent: Mar. 30, 2021

(54) INFORMATION PROCESSING DEVICE, INFORMATION PROCESSING METHOD, AND INDIVIDUAL IMAGING DEVICE FOR MEASUREMENT OF A SIZE OF A SUBJECT

(71) Applicant: SONY SEMICONDUCTOR SOLUTIONS CORPORATION, Kanagawa (JP)

(72) Inventors: Hiroaki Ono, Kanagawa (JP); Tomonori Masuno, Kanagawa (JP); Shun Li, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/615,236

(22) PCT Filed: Apr. 12, 2018

(86) PCT No.: PCT/JP2018/015399
§ 371 (c)(1),
(2) Date: Nov. 20, 2019

(87) PCT Pub. No.: WO2019/008861
PCT Pub. Date: Jan. 10, 2019

(65) Prior Publication Data
US 2020/0167944 A1    May 28, 2020

(30) Foreign Application Priority Data

Jul. 5, 2017    (JP) .................................. 2017-131634

(51) Int. Cl.
*G06T 7/62*    (2017.01)
*G06T 7/50*    (2017.01)
(Continued)

(52) U.S. Cl.
CPC ................ *G06T 7/62* (2017.01); *G01B 11/02* (2013.01); *G01B 11/22* (2013.01); *G06T 7/50* (2017.01);
(Continued)

(58) Field of Classification Search
None
See application file for complete search history.

(56) References Cited

U.S. PATENT DOCUMENTS

| 4,773,029 A | 9/1988 | Claesson et al. |
| 5,105,392 A | 4/1992 | Stringer et al. |

(Continued)

FOREIGN PATENT DOCUMENTS

| CN | 107076541 A | 8/2017 |
| CN | 107289855 A | 10/2017 |

(Continued)

OTHER PUBLICATIONS

Wansong Li, Xianyu Su, and Zhongbao Liu, "Large-scale three-dimensional object measurement: a practical coordinate mapping and image data-patching method," Appl. Opt. 40, 3326-3333 (Year: 2001).*

(Continued)

*Primary Examiner* — Jayanti K Patel
*Assistant Examiner* — Stefan Gadomski
(74) *Attorney, Agent, or Firm* — Chip Law Group

(57) ABSTRACT

It is desired to provide technology that enables automatic measurement of the size of a subject with a reduced number of frames of images required, relaxed restrictions on the coverage and light projection, and no limitation on the shape of the subject. Provided is an information processing device including: a depth information acquiring unit configured to acquire depth information; a data conversion unit configured to convert the depth information into three-dimensional (Continued)

data; a subject extraction unit configured to extract a subject area where a subject is present on the basis of the three-dimensional data; and a size measurement unit configured to measure a size of the subject on the basis of the subject area, in which the size measurement unit detects six planes circumscribing the subject area and measures the size of the subject on the basis of the six planes.

21 Claims, 25 Drawing Sheets

(51) Int. Cl.
    *H04N 5/232*     (2006.01)
    *G01B 11/02*     (2006.01)
    *G01B 11/22*     (2006.01)
(52) U.S. Cl.
    CPC ............... *H04N 5/232939* (2018.08); *G06T 2207/10028* (2013.01)

(56) References Cited

U.S. PATENT DOCUMENTS

| | | | |
|---|---|---|---|
| 9,424,461 B1* | 8/2016 | Yuan | G06K 9/00214 |
| RE46,976 E * | 7/2018 | Makii | H04N 5/23293 |
| 2005/0226532 A1* | 10/2005 | Thompson | G06T 7/60 |
| | | | 382/286 |
| 2009/0213219 A1* | 8/2009 | Eggert | G06T 7/277 |
| | | | 348/148 |
| 2011/0187704 A1* | 8/2011 | Chen | G06T 15/00 |
| | | | 345/419 |
| 2012/0224052 A1* | 9/2012 | Bae | G01B 11/026 |
| | | | 348/135 |
| 2012/0294481 A1* | 11/2012 | Kasaoki | G06K 9/4638 |
| | | | 382/103 |
| 2013/0050446 A1* | 2/2013 | Matsuoka | H04N 13/221 |
| | | | 348/51 |
| 2013/0094705 A1* | 4/2013 | Tyagi | F16P 3/144 |
| | | | 382/103 |
| 2013/0148845 A1* | 6/2013 | Maeda | G08G 1/04 |
| | | | 382/103 |
| 2013/0222543 A1* | 8/2013 | Bae | G01S 17/894 |
| | | | 348/46 |
| 2014/0104414 A1* | 4/2014 | McCloskey | G01B 11/02 |
| | | | 348/135 |
| 2014/0104416 A1* | 4/2014 | Giordano | G01N 9/02 |
| | | | 348/135 |
| 2015/0003684 A1* | 1/2015 | Appia | G06K 9/2036 |
| | | | 382/106 |
| 2015/0063722 A1* | 3/2015 | Connell, II | G06T 17/10 |
| | | | 382/285 |
| 2015/0092989 A1* | 4/2015 | Kasaoki | G06K 9/4661 |
| | | | 382/104 |
| 2015/0097927 A1* | 4/2015 | Zhao | H04N 13/261 |
| | | | 348/43 |
| 2015/0109442 A1* | 4/2015 | Derenne | A61B 5/1113 |
| | | | 348/143 |
| 2015/0130908 A1* | 5/2015 | Kang | H04N 13/271 |
| | | | 348/46 |
| 2015/0172637 A1* | 6/2015 | Yoon | G06T 7/149 |
| | | | 348/46 |
| 2015/0254857 A1* | 9/2015 | Huang | G06F 19/00 |
| | | | 382/154 |
| 2015/0278615 A1* | 10/2015 | Ogawa | H04N 5/23229 |
| | | | 348/148 |
| 2016/0012611 A1* | 1/2016 | Wexler | G06T 7/62 |
| | | | 382/103 |
| 2016/0098603 A1* | 4/2016 | Kim | G06Q 30/0201 |
| | | | 348/143 |
| 2016/0171749 A1* | 6/2016 | Mizuo | H04N 13/128 |
| | | | 382/190 |
| 2016/0210754 A1* | 7/2016 | Ida | G06T 7/586 |
| 2016/0225180 A1* | 8/2016 | Chang | G06T 15/08 |
| 2016/0255329 A1* | 9/2016 | Lee | H04N 13/211 |
| | | | 382/154 |
| 2016/0335491 A1* | 11/2016 | Wang | G06K 9/00369 |
| 2017/0084044 A1* | 3/2017 | Keh | H04N 13/207 |
| 2017/0140550 A1* | 5/2017 | Zhang | G06T 7/50 |
| 2017/0176596 A1* | 6/2017 | Shpunt | G01S 17/42 |
| 2017/0193699 A1* | 7/2017 | Mehr | G06F 17/10 |
| 2017/0272728 A1* | 9/2017 | Rafii | H04N 13/246 |
| 2017/0277943 A1* | 9/2017 | Shingu | G06T 7/20 |
| 2017/0285218 A1* | 10/2017 | Zhang | G01N 23/046 |
| 2017/0302905 A1 | 10/2017 | Shteinfeld et al. | |
| 2017/0336195 A1 | 11/2017 | Suzuki et al. | |
| 2018/0075618 A1* | 3/2018 | Lai | G01B 11/2545 |
| 2018/0144458 A1* | 5/2018 | Xu | G06T 7/70 |
| 2018/0157155 A1* | 6/2018 | Gryshchenko | G03B 21/2033 |
| 2018/0218513 A1* | 8/2018 | Ho | G06T 7/73 |
| 2018/0218535 A1* | 8/2018 | Ceylan | G06T 1/0007 |
| 2018/0227574 A1* | 8/2018 | Hefeeda | H04N 13/268 |
| 2018/0260626 A1* | 9/2018 | Pestun | G08G 5/0086 |
| 2018/0267142 A1* | 9/2018 | Motoyama | G01S 13/86 |
| 2018/0347962 A1* | 12/2018 | Zhao | G01B 11/02 |
| 2018/0374232 A1* | 12/2018 | Kadowaki | G07F 17/12 |
| 2019/0095720 A1* | 3/2019 | Ju | H04N 7/18 |
| 2019/0156564 A1* | 5/2019 | Tung | G06T 7/50 |
| 2019/0195616 A1* | 6/2019 | Cao | G01B 11/22 |
| 2020/0134849 A1* | 4/2020 | Blasco Claret | G06T 7/593 |

FOREIGN PATENT DOCUMENTS

| | | |
|---|---|---|
| EP | 0415771 A2 | 3/1991 |
| EP | 3232404 A1 | 10/2017 |
| JE | 3688823 T2 | 1/1994 |
| JP | 62-502707 A | 10/1987 |
| JP | 2009-535607 A | 10/2009 |
| JP | 2013-196355 A | 9/2013 |
| JP | 2013-253799 A | 12/2013 |
| JP | 2017-191605 A | 10/2017 |
| KR | 10-2009-0016562 A1 | 2/2009 |
| WO | 86/006473 A1 | 11/1986 |
| WO | 92/016818 A1 | 10/1992 |
| WO | 2007/124568 A1 | 11/2007 |
| WO | 2014/006832 A1 | 1/2014 |
| WO | 2016/199366 A1 | 12/2016 |

OTHER PUBLICATIONS

International Search Report and Written Opinion of PCT Application No. PCT/JP2018/015399, dated Jul. 10, 2018, 08 pages of ISRWO.

* cited by examiner 30-8  30-9  30-10

30-11  30-12  30-13

INFORMATION PROCESSING DEVICE, INFORMATION PROCESSING METHOD, AND INDIVIDUAL IMAGING DEVICE FOR MEASUREMENT OF A SIZE OF A SUBJECT

CROSS REFERENCE TO RELATED APPLICATIONS

This application is a U.S. National Phase of International Patent Application No. PCT/JP2018/015399 filed on Apr. 12, 2018, which claims priority benefit of Japanese Patent Application No. JP 2017-131634 filed in the Japan Patent Office on Jul. 5, 2017. Each of the above-referenced applications is hereby incorporated herein by reference in its entirety.

TECHNICAL FIELD

The present disclosure relates to an information processing device, an information processing method, and an individual imaging device.

BACKGROUND ART

In recent years, there has been technology for measuring the size of a subject. For example, technology is disclosed in which the size of a subject is measured on the basis of specified positions when a rectangular parallelepiped subject is captured by a camera and displayed on the screen, and a user specifies these positions of a total of four points on the screen including a vertex of three sides of the rectangular parallelepiped subject converging at the vertex and the other ends of the three sides on the opposite side to the vertex (for example, see Patent Document 1).

Also disclosed is technology related to a size measuring device including: a light projecting unit configured to project a light pattern having a geometric shape onto the vicinity of a vertex where three sides of a rectangular parallelepiped subject converge; two cameras configured to capture the light pattern reflected by the subject; and a measuring unit configured to measure the size of the subject on the basis of parallax information obtained from images captured by the respective two cameras (for example, see Patent Document 2). It is premised that such a size measuring device includes an active stereo camera including a light projecting unit configured to project a geometrical light pattern and two cameras.

Furthermore, also disclosed is technology related to a measuring device including: an image acquiring unit configured to periodically acquire a distance image; a shape data generating unit configured to generate shape data for each distance image on the basis of distance images of a plurality of frames; an estimation unit configured to estimate the position and the angle for each of the distance images on the basis of the distance images of the plurality of frames; a detection unit configured to detect a subject on the basis of the shape data, the position, and the angle; and a measurement unit configured to measure the size of the detected subject (for example, see Patent Document 3).

CITATION LIST

Patent Document

Patent Document 1: International Publication No. 14/006832

Patent Document 2: Japanese Patent Application Laid-Open No. 2013-253799
Patent Document 3: Japanese Patent Application Laid-Open No. 2013-196355

SUMMARY OF THE INVENTION

Problems to be Solved by the Invention

However, in a case where a user needs to specify positions in order to measure the size of a subject, the user is required to perform the act of specifying the positions, and the shape of a subject is limited to a rectangular parallelepiped. Moreover, in a case where it is necessary to project a light pattern having a geometric shape onto the vicinity of a vertex where three sides of a rectangular parallelepiped subject converge, the coverage and light projection are disadvantageously restricted. Furthermore, in a case where it is necessary to capture a plurality of frames of distance images, it takes time to capture the plurality of frames of the distance images.

Therefore, it is desired to provide technology that enables automatic measurement of the size of a subject with a reduced number of frames of images required, relaxed restrictions on the coverage and light projection, and no limitation on the shape of the subject.

Solutions to Problems

According to the present disclosure, provided is an information processing device including: a depth information acquiring unit configured to acquire depth information; a data conversion unit configured to convert the depth information into three-dimensional data; a subject extraction unit configured to extract a subject area where a subject is present on the basis of the three-dimensional data; and a size measurement unit configured to measure a size of the subject on the basis of the subject area, in which the size measurement unit detects six planes circumscribing the subject area and measures the size of the subject on the basis of the six planes.

According to the present disclosure, provided is an information processing method including: acquiring depth information; converting the depth information into three-dimensional data; extracting a subject area where a subject is present on the basis of the three-dimensional data; and measuring a size of the subject on the basis of the subject area, in which a processor detects six planes circumscribing the subject area and measures the size of the subject on the basis of the six planes.

According to the present disclosure, provided is an individual imaging device including: a depth information acquiring unit configured to acquire depth information; a data conversion unit configured to convert the depth information into three-dimensional data; a subject extraction unit configured to extract a subject area where a subject is present on the basis of the three-dimensional data; and a size measurement unit configured to measure a size of the subject on the basis of the subject area, in which the size measurement unit detects six planes circumscribing the subject area and measures the size of the subject on the basis of the six planes.

Effects of the Invention

As described above, the present disclosure provides technology that enables automatic measurement of the size of a subject with a reduced number of frames of images required, relaxed restrictions on the coverage and light projection, and no limitation on the shape of the subject. Note that the above effects are not necessarily limiting, and any one of effects described herein or other effects that can be grasped from this specification may be exerted together with the above effects or in place of the above effects.

MODE FOR CARRYING OUT THE INVENTION

Figure 1:
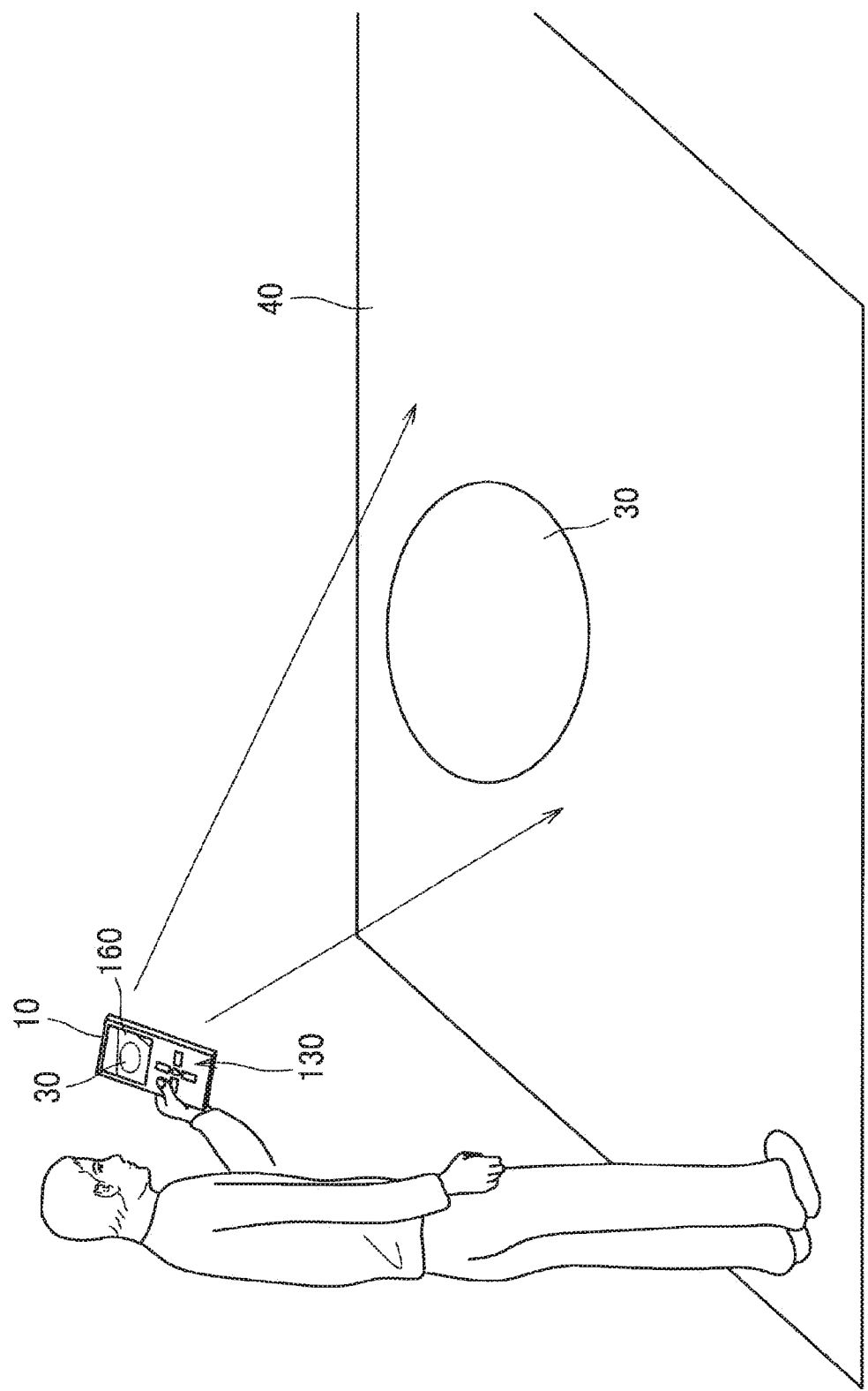
FIG. 1 is a diagram illustrating a situation where an information processing device according to an embodiment of the present disclosure is used.

Preferred embodiments of the present disclosure will be described in detail below with reference to the accompanying drawings. Note that in the present specification and the drawings, components having substantially the same functional configuration are denoted by the same symbol, thereby omitting redundant explanations.

Moreover, in this specification and the drawings, there are cases where a plurality of components having substantially the same or similar functional configuration is distinguished by adding different numbers after the same symbol. Note that in a case where it is not necessary to particularly distinguish each of multiple components having substantially the same or similar functional configuration, they are denoted by only the same symbol. In addition, there are cases where similar components of different embodiments are distinguished by adding different alphabets after the same symbol. Note that in a case where it is not necessary to particularly distinguish each of similar components, they are denoted by only the same symbol.

Note that explanation will be given in the following order.
0. Overview
1. First Embodiment
1.1. Functional Configuration Example of Information Processing Device
1.2. Functional Details of Information Processing Device
1.2.1. Examples of Imaging Direction
1.2.2. Acquisition of Three-Dimensional Data
1.2.3. Calculation of Gravity Direction 1.2.4. Extraction of Subject
1.2.5. Calculation of Reference Plane
1.2.6. Size Measurement
1.2.7. Display Based on Size
1.2.8. Exemplary Configuration of Sensor
1.2.9. Multiple Subjects
1.2.10. Exemplary Operation
1.2.11. Obtaining Depth Information Multiple Times
1.2.12. Exemplary Operation for Obtaining Depth Information Multiple Times
1.2.13. Summary of First Embodiment
2. Second Embodiment
2.1. Functional Configuration Example of Information Processing Device
2.2. Detailed Functions of Information Processing Device
2.2.1. Automatic Subject Selection
2.2.2. Subject Selection Based on User Operation
2.2.3. Exemplary Operation for Selecting Subject
2.2.4. Summary of Second Embodiment
3. Exemplary Hardware Configuration
4. Conclusion 0. Overview In recent years, there has been technology for measuring the size of a subject. For example, technology is disclosed in which the size of a subject is measured on the basis of specified positions when a rectangular parallelepiped subject is captured by a camera and displayed on the screen, and a user specifies these positions of a total of four points on the screen including a vertex of three sides of the rectangular parallelepiped subject converging at the vertex and the other ends of the three sides on the opposite side to the vertex.

However, in a case where a user needs to specify positions in order to measure the size of a subject, the user is required to perform the act of specifying the positions, and the shape of a subject is limited to a rectangular parallelepiped.

Also disclosed is technology related to a size measuring device including: a light projecting unit configured to project a light pattern having a geometric shape onto the vicinity of a vertex where three sides of a rectangular parallelepiped subject converge; two cameras configured to capture the light pattern reflected by the subject; and a measuring unit configured to measure the size of the subject on the basis of parallax information obtained from images captured by the respective two cameras. It is premised that such a size measuring device includes an active stereo camera including a light projecting unit configured to project a geometrical light pattern and two cameras.

However, in a case where it is necessary to project a light pattern having a geometric shape onto the vicinity of a vertex where three sides of a rectangular parallelepiped subject converge in order to measure the size of the subject, the coverage and light projection are disadvantageously restricted.

Furthermore, also disclosed is technology related to a measuring device including: an image acquiring unit configured to periodically acquire a distance image; a shape data generating unit configured to generate shape data for each distance image on the basis of distance images of a plurality of frames; an estimation unit configured to estimate the position and the angle for each of the distance images on the basis of the distance images of the plurality of frames; a detection unit configured to detect a subject on the basis of the shape data, the position, and the angle; and a measurement unit configured to measure the size of the detected subject.

However, in a case where it is necessary to capture a plurality of frames of distance images in order to measure the size of the subject, it takes time to capture the plurality of frames of the distance images.

FIG. 1 is a diagram illustrating a situation where an information processing device according to an embodiment of the present disclosure is used. As illustrated in FIG. 1, a subject 30 is placed on a plane 40. Note that the subject 30 may be present at a place different from being on the plane 40. Meanwhile, a user holds an information processing device 10. The information processing device 10 includes a camera (not illustrated). When the camera is directed toward the subject 30, the subject 30 captured by the camera is displayed on a display unit 160 of the information processing device 10, and the size of the subject 30 is measured.

According to the information processing device 10 of the embodiment of the present disclosure, it is possible to automatically measure the size of the subject 30 with a reduced number of frames of images required, relaxed restrictions on the coverage and light projection, and no limitation on the shape of the subject. Details of such an information processing device 10 will be described below.

An overview of the embodiment of the present disclosure has been described above.

First Embodiment

Subsequently, a first embodiment of the present disclosure will be described.

1.1. Functional Configuration Example of Information Processing Device

Figure 2:
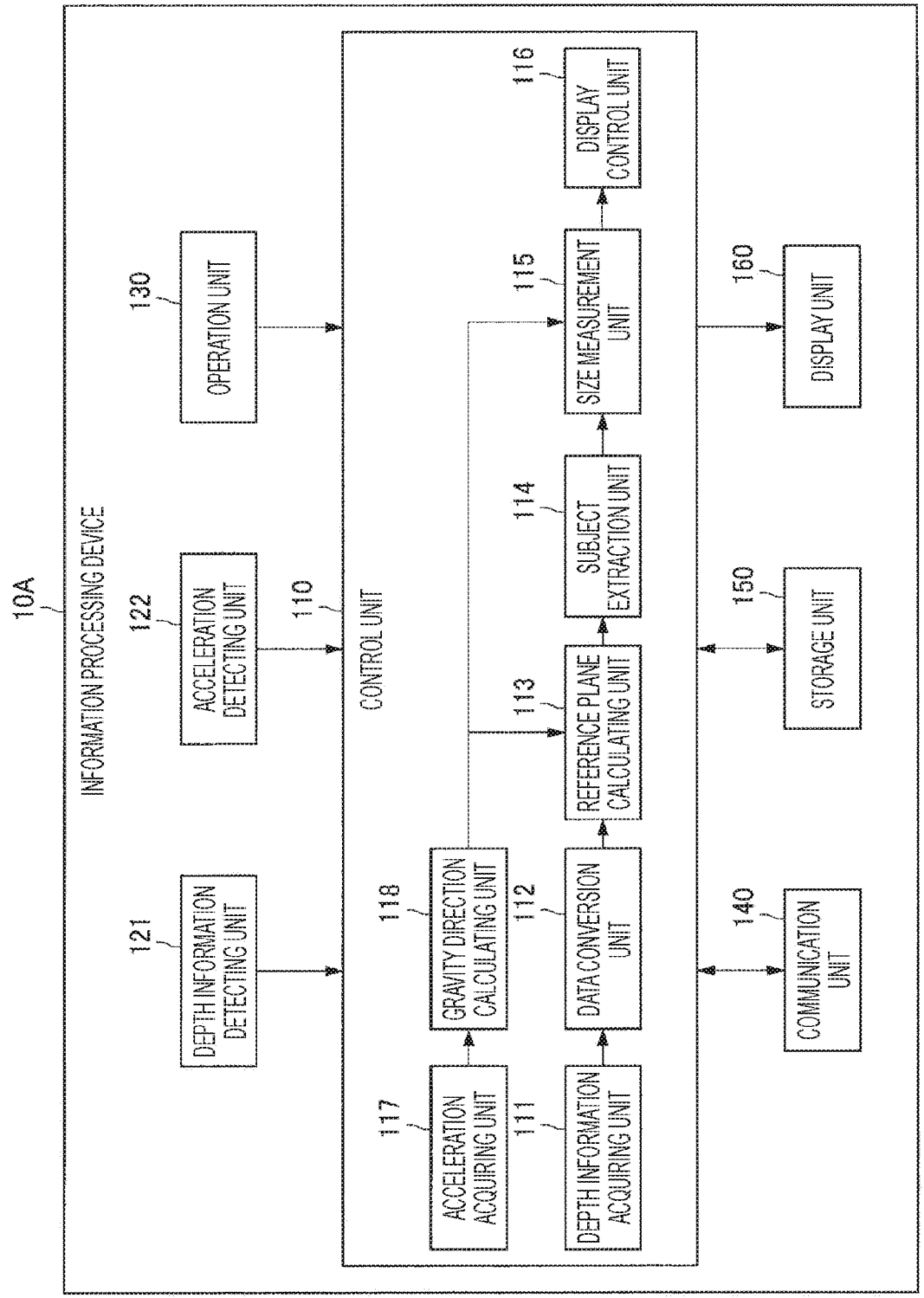
FIG. 2 is a block diagram illustrating a functional configuration example of an information processing device according to a first embodiment of the present disclosure.

Subsequently, a functional configuration example of an information processing device according to a first embodiment of the present disclosure will be described. FIG. 2 is a block diagram illustrating a functional configuration example of the information processing device according to the first embodiment of the present disclosure. As illustrated in FIG. 2, an information processing device 10A according to the first embodiment of the present disclosure includes a control unit 110, a depth information detecting unit 121, an acceleration detecting unit 122, an operation unit 130, a communication unit 140, a storage unit 150, and a display unit 160.

In the first embodiment of the present disclosure, the control unit 110 includes a depth information acquiring unit 111, a data conversion unit 112, a reference plane calculating unit 113, a subject extraction unit 114, a size measurement unit 115, a display control unit 116, an acceleration acquiring unit 117, and a gravity direction calculating unit 118. Hereinafter, these functional blocks included in the information processing device 10A will be described.

Note that the information processing device 10A according to the embodiment of the present disclosure is applicable to various electronic devices. For example, an electronic device to which the information processing device 10A is applied may be a smartphone, a mobile phone, a tablet terminal, or a head mounted display. Alternatively, an electronic device to which the information processing device 10A is applied may be an imaging device (for example, an individual imaging device). The imaging device may be a digital camera, an onboard camera mounted on a vehicle, or the like.

The control unit 110 may include a processing device such as one or a plurality of central processing units (CPUs). In a case where these blocks include a processing device such as a CPU, the processing device may include an electronic circuit. These blocks will be described in detail later.

The depth information detecting unit 121 includes a sensor that detects depth information. In the first embodiment of the present disclosure, it is mainly assumed that the depth information detecting unit 121 includes a time of flight (TOF) sensor. In a case where the depth information detecting unit 121 includes a TOF sensor, there are several advantages.

For example, there are possibilities that size measurement of a subject is performed in an environment where the amount of light is insufficient (for example, in a dark environment such as inside a room) or that size measurement is performed on a subject without a pattern (for example, cardboard). Therefore, it is useful to obtain highly accurate depth information used for size measurement of a subject. With the TOF sensor, an active approach (by irradiation with light) makes it possible to obtain depth information of a subject with high accuracy even in an environment where the amount of light is insufficient. The TOF sensor also makes it possible to obtain depth information of a subject having no pattern with high accuracy.

However, the depth information detecting unit 121 may include a sensor other than TOF sensors. For example, the depth information detecting unit 121 may include a distance image sensor supporting the structured light method, or may include a stereo camera.

The acceleration detecting unit 122 includes an acceleration sensor. For example, the acceleration detected by the acceleration detecting unit 122 is provided to the control unit 110 and is used for calculation of the gravity direction by the control unit 110. Note that the information processing device 10A does not need to include the acceleration detecting unit 122 in a case where the gravity direction is not used by the control unit 110.

The operation unit 130 has a function of accepting an operation input by a user. In the first embodiment of the present disclosure, it is mainly assumed that the operation unit 130 includes a touch panel and a button. Note that the operation unit 130 may include a mouse, a keyboard, a switch, a lever, or the like. The operation unit 130 may also include a microphone that detects user's voice.

The communication unit 140 includes a communication circuit, and has a function of acquiring data from another device connected to a communication network and providing data to the other device via the communication network. For example, the communication unit 140 includes a communication interface.

The storage unit 150 includes a memory, and is a recording medium that stores a program to be executed by the control unit 110 and stores data necessary for execution of the program. The storage unit 150 also temporarily stores data for arithmetic operation by the control unit 110. For example, the storage unit 150 includes a magnetic storage device, a semiconductor storage device, an optical storage device, or a magneto-optical storage device.

The display unit 160 outputs various types of information. For example, the display unit 160 may include a display capable of performing display that is visible to a user. In this case, the display may be a liquid crystal display or an organic electro-luminescence (EL) display. Note that the information processing device 10A does not need to include the display unit 160 in a case where it is not necessary to display information.

Note that, in the first embodiment of the present disclosure, it is mainly assumed that the depth information detecting unit 121, the acceleration detecting unit 122, the operation unit 130, the communication unit 140, the storage unit 150, and the display unit 160 are inside the information processing device 10A. However, at least one of the depth information detecting unit 121, the acceleration detecting unit 122, the operation unit 130, the communication unit 140, the storage unit 150, or the display unit 160 may be outside the information processing device 10A.

The functional configuration example of the information processing device 10A according to the first embodiment of the present disclosure has been described above.

1.2. Detailed Functions of Information Processing Device

Subsequently, detailed functions of the information processing device 10A according to the first embodiment of the present disclosure will be described. First, a user adjusts the position and the attitude of the information processing device 10 so that the subject 30 is imaged by the depth information detecting unit 121.

1.2.1. Examples of Imaging Direction

Figure 3:
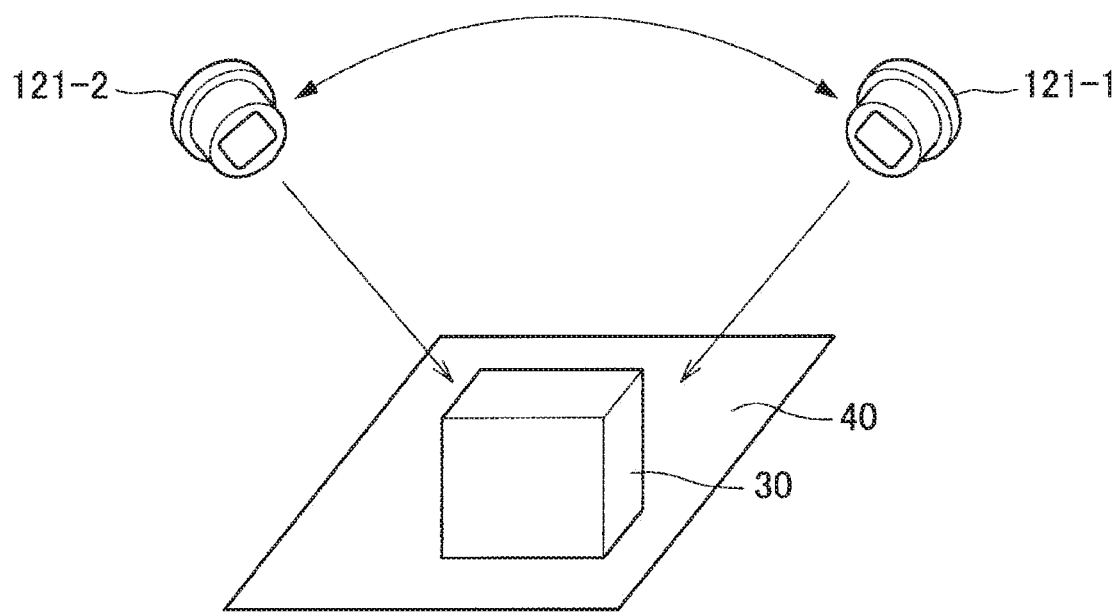
FIG. 3 is a first diagram for explaining exemplary imaging directions of a depth information detecting unit.

FIG. 3 is a first diagram for explaining exemplary imaging directions of the depth information detecting unit 121. Referring to FIG. 3, the subject 30 is placed on the plane 40. Here, the depth information detecting unit 121 is preferably arranged at a position where at least the upper plane of the subject 30 can be detected. Detection of the upper plane of the subject 30 enables easy detection of six planes circumscribing a subject area on the basis of the shape and the position of the upper plane of the subject 30.

Referring to FIG. 3, a depth information detecting unit 121-1 and a depth information detecting unit 121-2 are illustrated as examples of the depth information detecting unit 121 arranged at a position where the upper plane of the subject 30 can be detected. Incidentally, the position where the upper plane of the subject 30 can be detected can correspond to a position where the angle formed by the imaging direction and the normal direction of the plane 40 is larger than 90 degrees. In other words, the position where the upper plane of the subject 30 can be detected can correspond to a position where the angle formed by the imaging direction and the gravity direction is smaller than 90 degrees.

Figure 4:
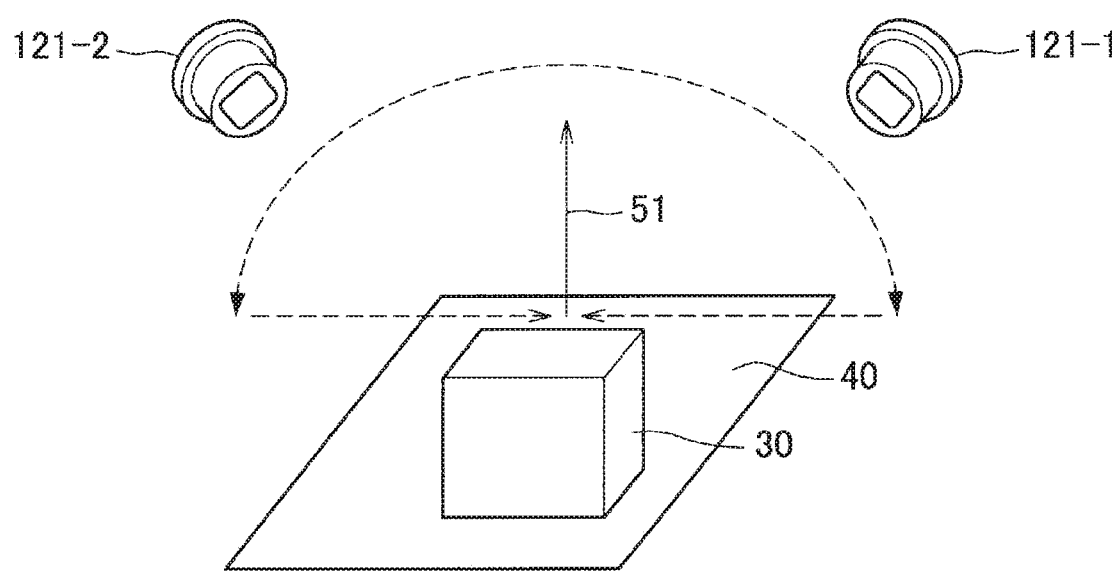
FIG. 4 is a second diagram for explaining exemplary imaging directions of the depth information detecting unit.

FIG. 4 is a second diagram for explaining exemplary imaging directions of the depth information detecting unit 121. Referring to FIG. 4, a normal direction 51 of the plane 40 on which the subject 30 is placed is illustrated. At this point, the depth information detecting unit 121 is preferably arranged so that the angle formed by the imaging direction and the normal direction 51 of the plane 40 becomes larger than 90 degrees. This allows the depth information detecting unit 121 to detect at least the upper plane of the subject 30. Referring to FIG. 4, as examples of the depth information detecting unit 121 arranged so that the angle formed by the imaging direction and the normal direction 51 of the plane 40 becomes larger than 90 degrees, the depth information detecting unit 121-1 and the depth information detecting unit 121-2 are illustrated.

Figure 5:
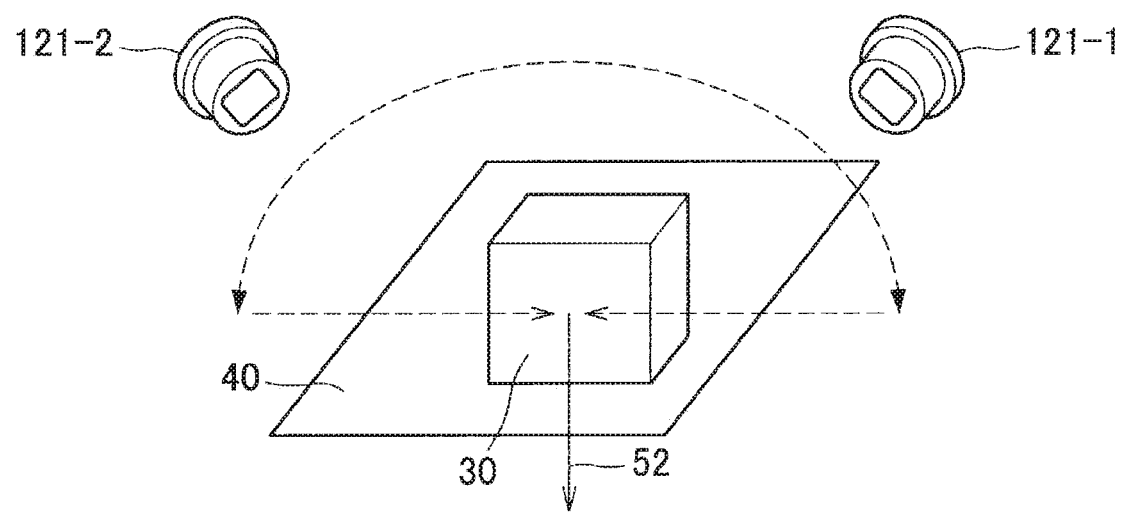
FIG. 5 is a third diagram for explaining exemplary imaging directions of the depth information detecting unit.

FIG. 5 is a third diagram for explaining exemplary imaging directions of the depth information detecting unit 121. Referring to FIG. 5, a gravity direction 52 is illustrated. At this point, the depth information detecting unit 121 is preferably arranged so that the angle formed by the imaging direction and the gravity direction 52 becomes less than 90 degrees. This allows the depth information detecting unit 121 to detect at least the upper plane of the subject 30. Referring to FIG. 5, as examples of the depth information detecting unit 121 arranged so that the angle formed by the imaging direction and the gravity direction 52 becomes less than 90 degrees, the depth information detecting unit 121-1 and the depth information detecting unit 121-2 are illustrated.

1.2.2. Acquisition of Three-Dimensional Data

Returning to FIG. 2, descriptions will be continued. The depth information acquiring unit 111 acquires the depth information detected by the depth information detecting unit 121. The data conversion unit 112 converts the depth information acquired by the depth information acquiring unit 111 into three-dimensional data. More specifically, the data conversion unit 112 converts distance information of each pixel included in the depth information into three-dimensional coordinates in the real space.

1.2.3. Calculation of Gravity Direction

The acceleration acquiring unit 117 acquires the acceleration detected by the acceleration detecting unit 122. The gravity direction calculating unit 118 calculates the gravity direction on the basis of the acceleration acquired by the acceleration acquiring unit 117. Note that the control unit 110 does not need to include the acceleration acquiring unit 117 and the gravity direction calculating unit 118 in a case where the gravity direction is not used by the control unit 110.

1.2.4. Extraction of Subject

The subject extraction unit 114 extracts a subject area where the subject is present on the basis of the three-dimensional data obtained by the data conversion unit 112. Here, the subject area may be extracted in any manner. For example, it is possible that a subject to be measured is present at the center of the coverage (screen) or close to the center. Therefore, the subject extraction unit 114 may determine a cluster of three-dimensional points as an object area by clustering on the basis of the three-dimensional data and extract an object area within a predetermined distance from the center of the coverage (screen) as the subject area.

Alternatively, there is a possibility that the subject to be measured is captured in the major part in the coverage (screen). Therefore, the subject extraction unit 114 may extract an object area having a screen occupancy rate larger than a predetermined rate as a subject area on the basis of the three-dimensional data. Alternatively, it is possible that the subject to be measured is present closest to the depth information detecting unit 121. Therefore, the subject extraction unit 114 may extract an object area closest to the depth information detecting unit 121 as the subject area.

Alternatively, a case is also assumed in which the shape of the subject to be measured is known in advance. Typically, a case is assumed in which the shape of the subject to be measured is known to be a rectangular parallelepiped; however, the shape of the subject to be measured is not limited to a rectangular parallelepiped. In such a case, the subject extraction unit 114 may extract an object area having a shape (predetermined shape) grasped in advance as the subject area.

A case is assumed where the shape of the subject to be measured is determined to be a rectangular parallelepiped. In such a case, the subject extraction unit 114 may extract, on the basis of the three-dimensional data, a vertex within a predetermined distance from the center of the coverage (screen) out of vertexes surrounded by three planes and a cluster of three-dimensional points including the three planes surrounding the vertex as the subject area. At this point, the subject extraction unit 114 may detect a vertex that appears as a protruding tip in the coverage (screen) out of the vertexes surrounded by three planes without simply detecting a vertex enclosed by three planes.

1.2.5. Calculation of Reference Plane

It is assumed in the first embodiment of the present disclosure that the reference plane calculating unit 113 calculates a reference plane and that the subject extraction unit 114 extracts, as a subject area, an object area present on the reference plane calculated by the reference plane calculating unit 113. This allows the subject area to be found promptly and highly accuracy. However, the subject extraction unit 114 may extract a subject area without considering the reference plane. In this case, the control unit 110 may not include the reference plane calculating unit 113.

Figure 6:
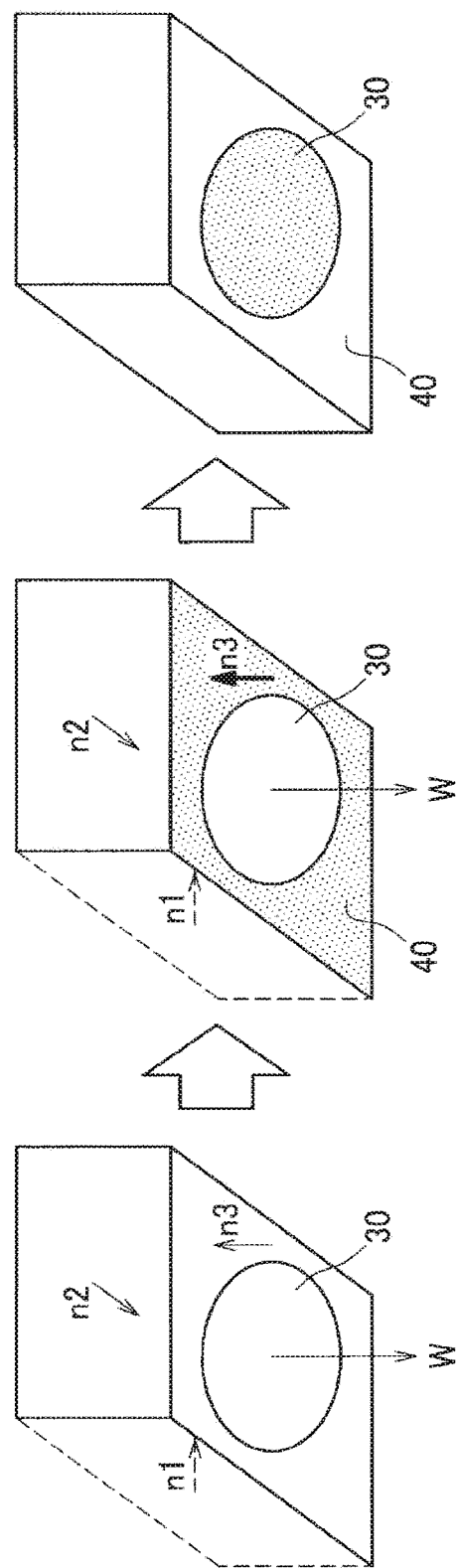
FIG. 6 is a diagram for explaining an exemplary calculation of a reference plane.

FIG. 6 is a diagram for explaining an example of calculating a reference plane. Referring to FIG. 6, there are three planes in the coverage (screen), and respective normal lines n1 to n3 of the three planes are illustrated. Here, assuming that an object is present on the reference plane, the reference plane is likely to be horizontal (perpendicular to the gravity direction). Therefore, as an example, it is preferable that the reference plane calculating unit 113 calculates the reference plane on the basis of the gravity direction W calculated by the gravity direction calculating unit 118.

More specifically, the reference plane calculating unit 113 is only required to detect a plane, the angle which forms with the gravity direction W coincides with 90 degrees or is close to 90 degrees, as the reference plane. In FIG. 6, an example is illustrated in which the plane 40 having the normal line n3 is detected as the reference plane since the angle formed by the plane 40 having the normal line n3 and the gravity direction W is 90 degrees, and an object area present on the reference plane is extracted as the subject area.

Note that it is mainly assumed in the first embodiment of the present disclosure that the reference plane calculating unit 113 detects a reference plane on the basis of the gravity direction; however, the reference plane calculating unit 113 may detect the reference plane by another means. For example, the reference plane calculating unit 113 may detect a dominant plane as the reference plane on the basis of the three-dimensional data obtained by the data conversion unit 112. That is, the reference plane calculating unit 113 may detect a plane having the largest occupancy rate in the coverage (screen) as the reference plane.

Alternatively, in a case where a subject is present on a plane, it is assumed that normal directions of the plane on which the subject is present and the upper plane of the subject match or are similar. However, it is assumed that the plane on which the subject is present is closer to the depth information detecting unit 121 than the upper plane of the subject is. Therefore, the reference plane calculating unit 113 may detect, as the reference plane, a plane having a longer distance from the depth information detecting unit 121 among a plurality of planes having matching or similar normal directions on the basis of the three-dimensional data obtained by the data conversion unit 112.

1.2.6. Size Measurement

The size measurement unit 115 measures the size of the subject on the basis of the subject area. At this point, the size measurement unit 115 detects six planes circumscribing the subject area, and measures the size of the subject on the basis of the six planes.

According to such a configuration, it becomes possible to automatically measure the size of a subject with a reduced number of frames of images required and relaxed restrictions on the coverage and light projection. Note that it is mainly assumed in the first embodiment of the present disclosure that each of six planes circumscribing the subject area is a rectangle and that a three-dimensional shape enclosed by the six planes circumscribing the subject area is a rectangular parallelepiped. That is, the size measurement unit 115 detects six planes of a rectangular parallelepiped that circumscribe the subject area, and measures the size of the subject on the basis of the six planes.

The six planes can be divided into an upper plane, a lower plane, and four side planes. Exemplary detection of the upper plane, the lower plane, and the four side planes will be described.

Figure 7:
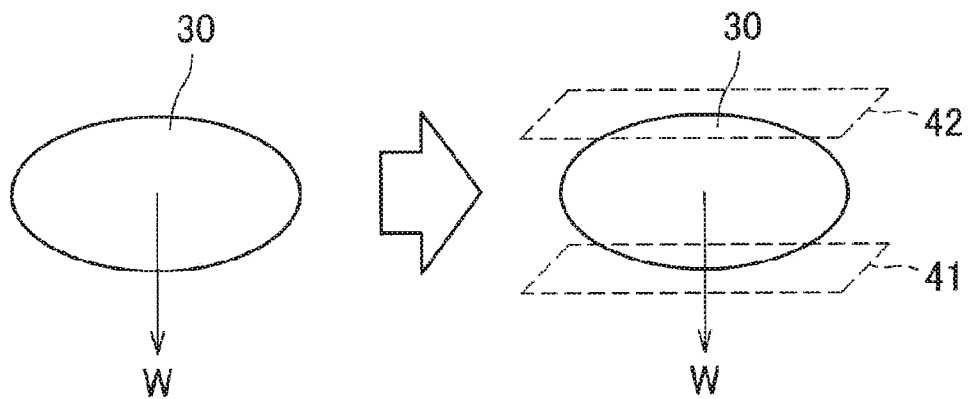
FIG. 7 is a diagram for explaining an exemplary calculation of an upper plane and a lower plane.

FIG. 7 is a diagram for explaining an exemplary calculation of an upper plane and a lower plane. Referring to FIG. 7, the subject 30 and a gravity direction W are illustrated. As illustrated in FIG. 7, the size measurement unit 115 detects, as an upper plane 42, a plane circumscribing the top of the subject area (the area where the subject 30 is present) out of two planes perpendicular to the vertical direction (gravity direction W) and circumscribing the subject area (the area where the subject 30 is present). The size measurement unit 115 also detects, as a lower plane 41, a plane circumscribing the bottom of the subject area.

Here, the vertical direction may be detected in any manner. In the first embodiment of the present disclosure, it is mainly assumed that the size measurement unit 115 detects the gravity direction W as the vertical direction. However, the size measurement unit 115 may detect the vertical direction by another means.

Figure 8:
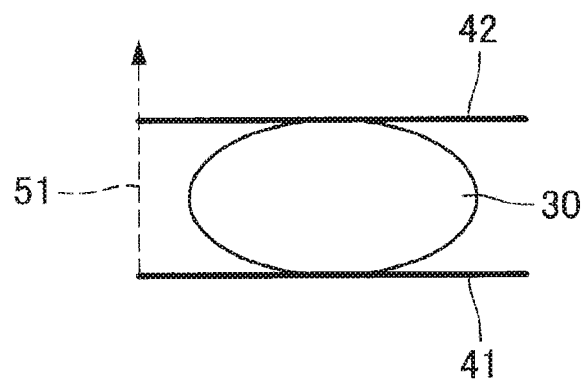
FIG. 8 is a diagram for explaining another exemplary calculation of the upper plane and the lower plane.

FIG. 8 is a diagram for explaining another exemplary calculation of an upper plane and a lower plane. Referring to FIG. 8, the normal direction 51 of the plane on which the subject is present is illustrated. The size measurement unit 115 may detect the normal direction 51 of the plane on which the subject is present as the vertical direction. The normal direction of the plane on which the subject is present may be the normal direction of the reference plane calculated by the reference plane calculating unit 113.

In this manner, after calculating the upper plane and the lower plane, the size measurement unit 115 calculates four side planes perpendicular to the upper plane, the four side planes including two pairs of parallel planes facing each other. Then, the size measurement unit 115 measures the distance between each of the three pairs of parallel planes facing each other of the six planes (upper plane, lower plane, and four side planes) as the size of the subject 30. Note that the size measurement unit 115 may measure the size of the subject 30 on the basis of the length of each of three sides extending from a vertex surrounded by three planes.

As the six planes circumscribing the subject area, only one combination of six planes may be detected; however, it is desirable that the size measurement unit 115 detect a plurality of combinations of six planes and that the size measurement unit 115 then determine six planes that are optimal for size measurement from the plurality of combinations of six planes. The six planes that are optimal for size measurement may be six planes having a volume that are closest to the volume of the size of the subject 30 (that is, six planes having the smallest volume).

That is, it is preferable that the size measurement unit 115 detect a plurality of combinations of six planes circumscribing the subject area (area where the subject 30 is present), detect six planes having the smallest enclosed volume thereby among the plurality of combinations of six planes, and measure the size of the subject 30 on the basis of the six planes having the smallest volume.

Figure 9:
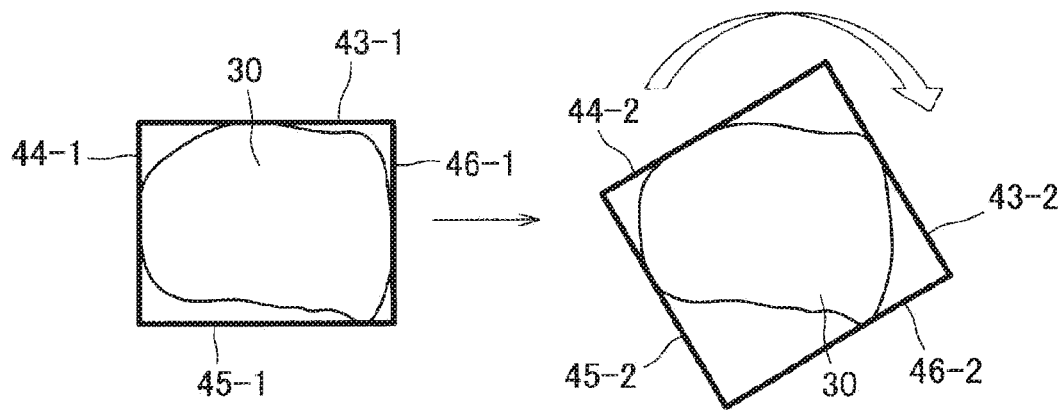
FIG. 9 is a diagram for explaining an example of size measurement.

FIG. 9 is a diagram for explaining an example of size measurement. Referring to FIG. 9, an example is illustrated in which the size measurement unit 115 has detected a side plane 43-1, a side plane 44-1, a side plane 45-1, and a side plane 46-1 as the four side planes. In addition, an example is illustrated in which a side plane 43-2, a side plane 44-2, a side plane 45-2, and a side plane 46-2 are detected by the size measurement unit 115 as four side planes obtained by rotating the above four side planes about the vertical direction as an axis.

In this manner, the size measurement unit 115 is only required to detect a plurality of combinations of six planes while rotating the four side planes and to detect six planes having the smallest enclosed volume from the plurality of combinations of six planes. The size measurement unit 115 measures the distance between each of the three pairs of parallel planes facing each other of the six planes (upper plane, lower plane, and four side planes) having the smallest enclosed volume as the size of the subject 30.

Figure 10:
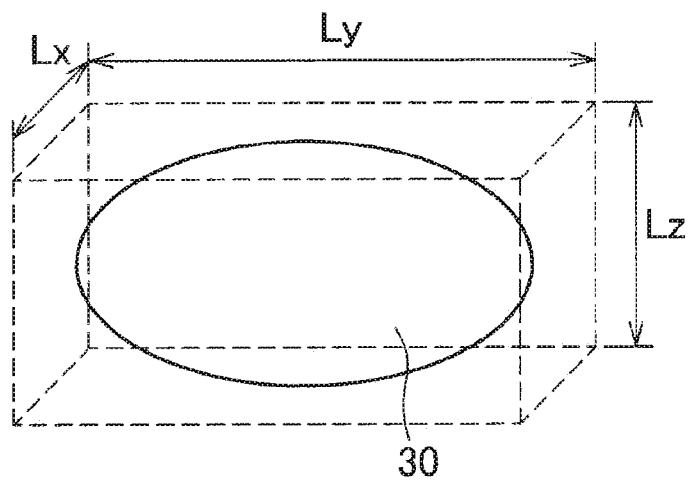
FIG. 10 is a diagram illustrating an exemplary distance between each of three pairs of parallel planes facing each other.

FIG. 10 is a diagram illustrating an exemplary distance between each of three pairs of parallel planes facing each other. Referring to FIG. 10, six planes having the smallest volume and circumscribing the subject area (the area where the subject 30 is present) are illustrated. In addition, referring to FIG. 10, the distances between each of the three pairs of parallel planes facing each other among the six planes are denoted as Lx, Ly, and Lz. As an example, the size measurement unit 115 may measure, as the size of the subject 30, the distances Lx, Ly, and Lz between each of the three pairs of parallel planes facing each other among the detected six planes.

Figure 11:
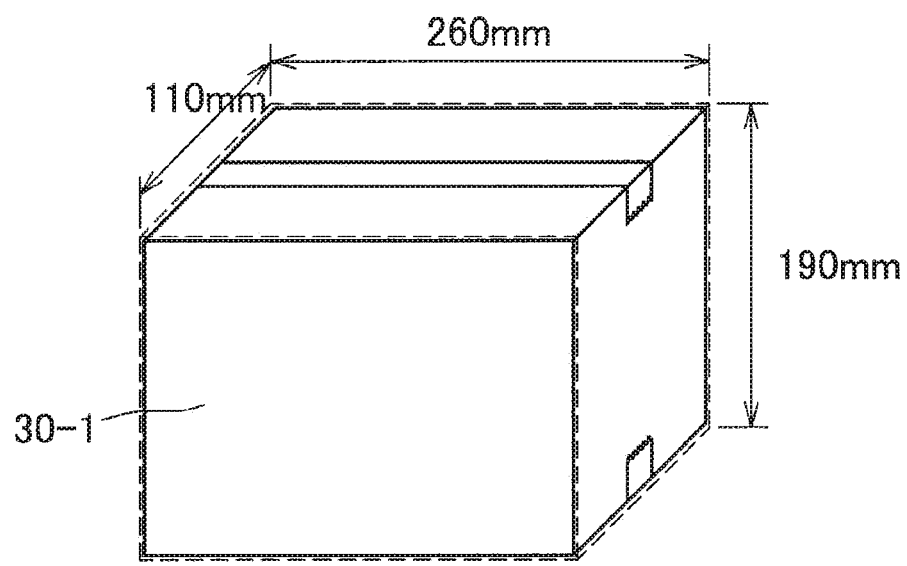
FIG. 11 is a diagram illustrating an exemplary result of size measurement of a box as an exemplary subject.

FIG. 11 is a diagram illustrating an exemplary result of size measurement of a box as an exemplary subject. Referring to FIG. 11, six planes circumscribing a box 30-1, as an exemplary subject, are detected, and among these six planes, the distances between each of the three pairs of parallel planes facing each other are illustrated as "110 mm", "190 mm", and "260 mm". As illustrated in this example, according to the first embodiment of the present disclosure, it is possible to measure the size of a rectangular parallelepiped subject.

Figure 12:
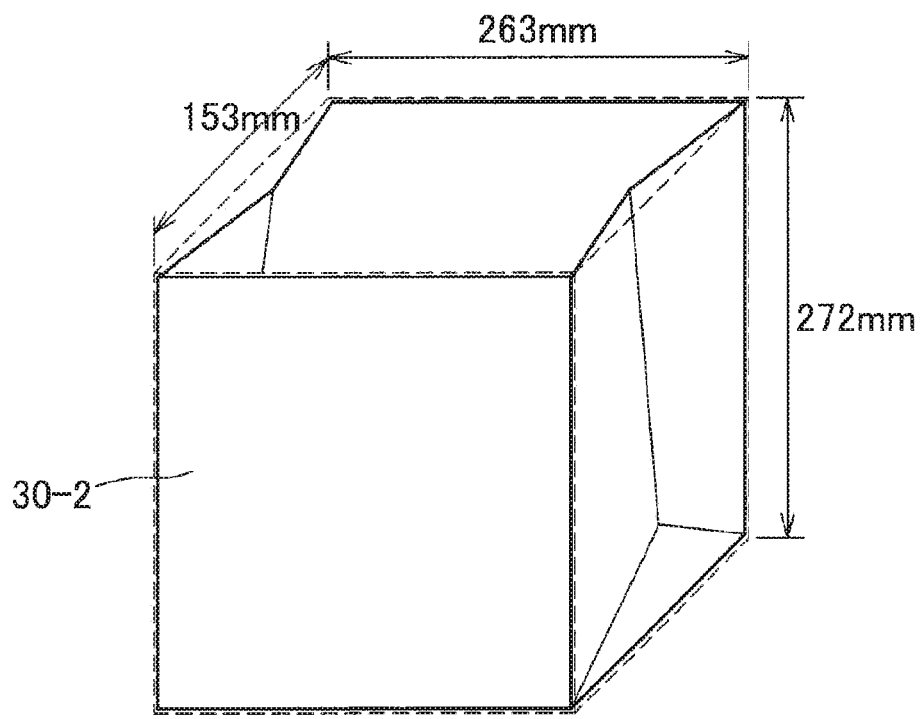
FIG. 12 is a diagram illustrating an exemplary result of size measurement of a paper bag as another exemplary subject.

FIG. 12 is a diagram illustrating an exemplary result of size measurement of a paper bag as another exemplary subject. Referring to FIG. 12, six planes circumscribing a paper bag 30-2, as another exemplary subject are detected, and among these six planes, the distances between each of the three pairs of parallel planes facing each other are illustrated as "153 mm", "272 mm", and "263 mm". As illustrated in this example, according to the first embodiment of the present disclosure, it is possible to measure the size of a subject having a shape other than a rectangular parallelepiped.

1.2.7. Display Based on Size

When the size of the subject 30 has been measured by the size measurement unit 115, the display control unit 116 performs control so that predetermined display based on the size of the subject 30 is displayed while superimposed on a captured image. Here, it is mainly assumed that the display control unit 116 controls the display of the distance image detected by the depth information detecting unit 121 as the captured image. However, the captured image is not limited to such an example. For example, the display control unit 116 may control display of an image captured by an image sensor which is different from the depth information detecting unit 121 as the captured image. It is expected that this improves the visibility of the subject 30.

Figure 13:
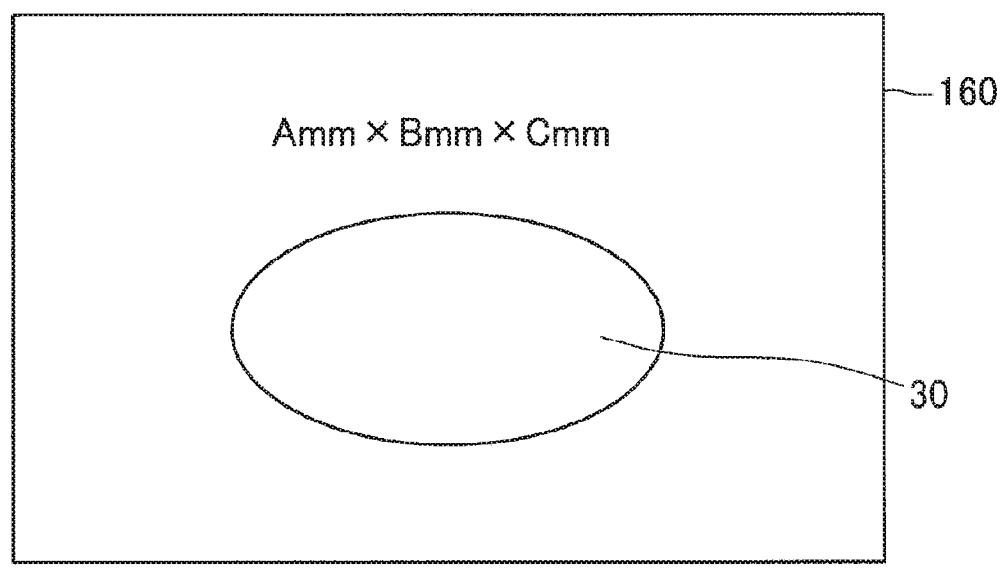
FIG. 13 is a diagram illustrating a first example of display based on the size of a subject.

FIG. 13 is a diagram illustrating a first example of display based on the size of the subject. Referring to FIG. 13, the display control unit 116 controls the display by the display unit 160 of the subject 30 detected by the depth information detecting unit 121. In addition, referring to FIG. 13, the display control unit 116 controls the display of the size of the subject 30 ((length×width×height=) A mm×B mm×C mm) as an example of display based on the size of the subject 30.

Figure 14:
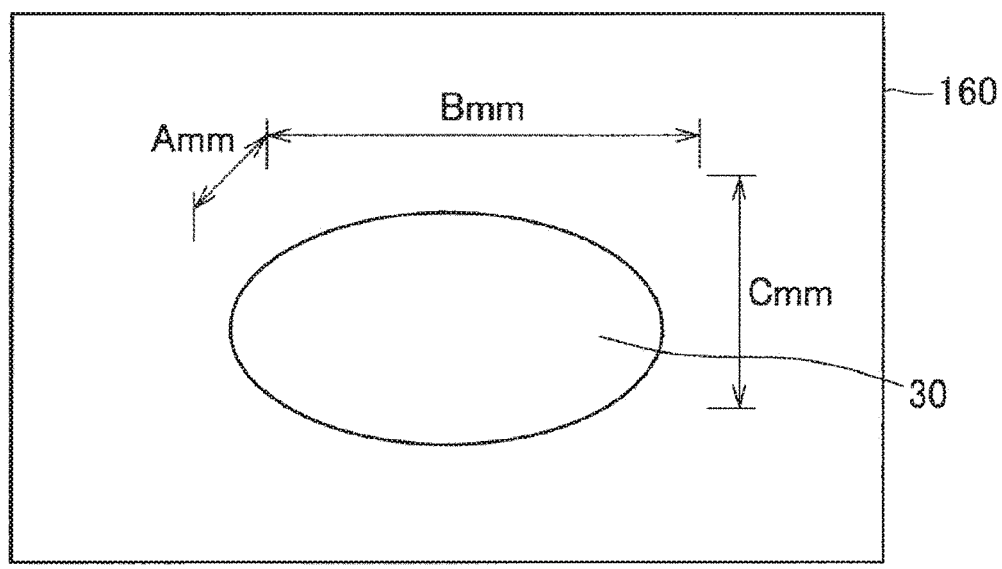
FIG. 14 is a diagram illustrating a second example of display based on the size of the subject.

FIG. 14 is a diagram illustrating a second example of display based on the size of the subject. Referring to FIG. 14, as an example of display based on the size of subject 30, display control unit 116 controls display over a range (in the example illustrated in FIG. 14, arrows in both directions) on the screen corresponding to the size of subject 30 (in the example illustrated in FIG. 14, the sizes of the length, the width, and the height). In FIG. 14, an example is illustrated in which the display control unit 116 also controls display at positions corresponding to each of the ranges (ranges of the length, the width, and the height) of the size of the subject ("A mm", "B mm", and "C mm").

Figure 15:
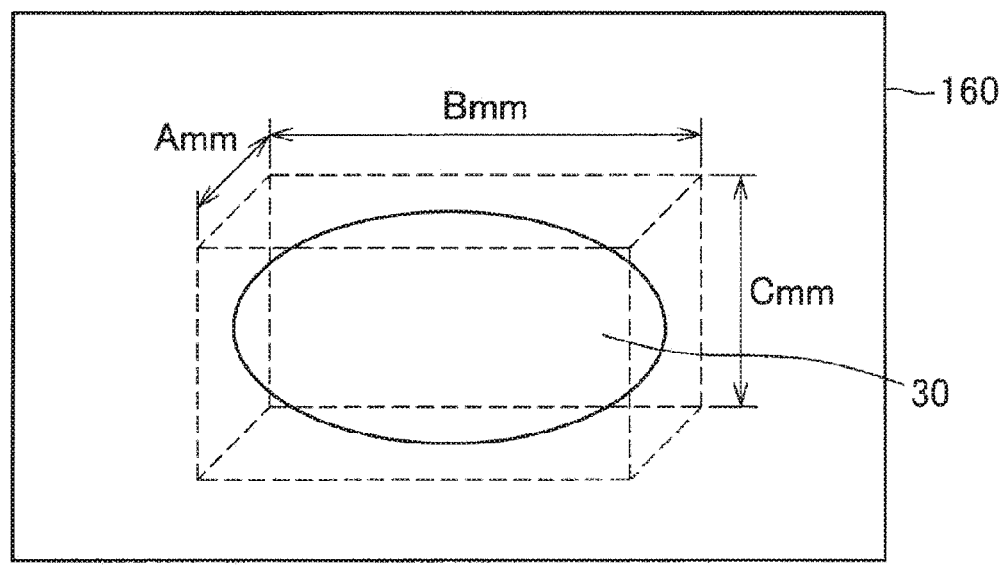
FIG. 15 is a diagram illustrating a third example of display based on the size of the subject.

FIG. 15 is a diagram illustrating a third example of display based on the size of the subject. Referring to FIG. 15, the display control unit 116 controls the display of six planes circumscribing the subject area as an example of display based on the size of the subject 30. In FIG. 15, an example is illustrated in which the display control unit 116 further controls the display of the size of the subject 30 ("A mm", "B mm", and "C mm") and ranges on the screen corresponding to the size of the subject 30 (arrows in both directions).

Figure 16:
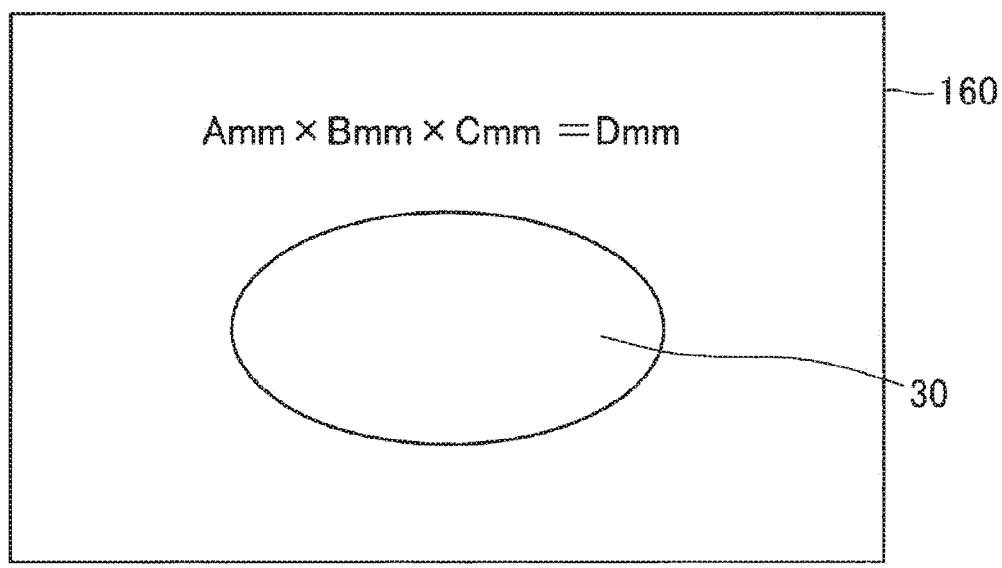
FIG. 16 is a diagram illustrating a fourth example of display based on the size of the subject.

FIG. 16 is a diagram illustrating a fourth example of display based on the size of the subject. Referring to FIG. 16, the display control unit 116 controls the display of the total size ("D mm") of the subject 30 as an example of display based on the size of the subject 30. The total size of the subject 30 may be the sum of the lengths ("A mm", "B mm", and "C mm") of three sides (length, width, and height) converging at one vertex of a rectangular parallelepiped that circumscribes the subject area. In FIG. 16, an example is illustrated in which the display control unit 116 also controls the display of the size of the subject 30 ("A mm", "B mm", and "C mm").

Figure 17:
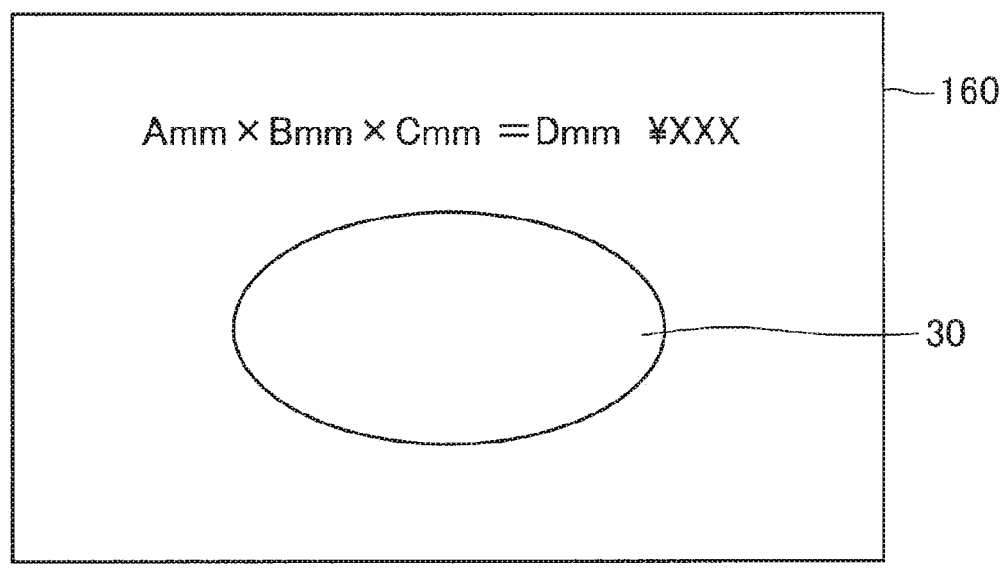
FIG. 17 is a diagram illustrating a fifth example of display based on the size of the subject.

FIG. 17 is a diagram illustrating a fifth example of display based on the size of the subject. Referring to FIG. 17, the display control unit 116 controls the display of the price ("¥ XXX") corresponding to the size of the subject 30 as an example of display based on the size of the subject 30. For example, the price may be the amount of money required for shipping by a shipping company, and the correspondence between the size and the price may be determined in advance. In FIG. 17, an example is illustrated in which the display control unit 116 further controls the display of the size of the subject 30 ("A mm", "B mm", and "C mm") and the display of the total size ("D mm") of the subject 30.

In the above, the example of display based on the size of the subject has been described. In this case, it is desirable to allow the user to understand which subject size the display is based on. That is, it is desirable that the display control unit 116 perform display control so that the subject area and other areas can be distinguished.

Figure 18:
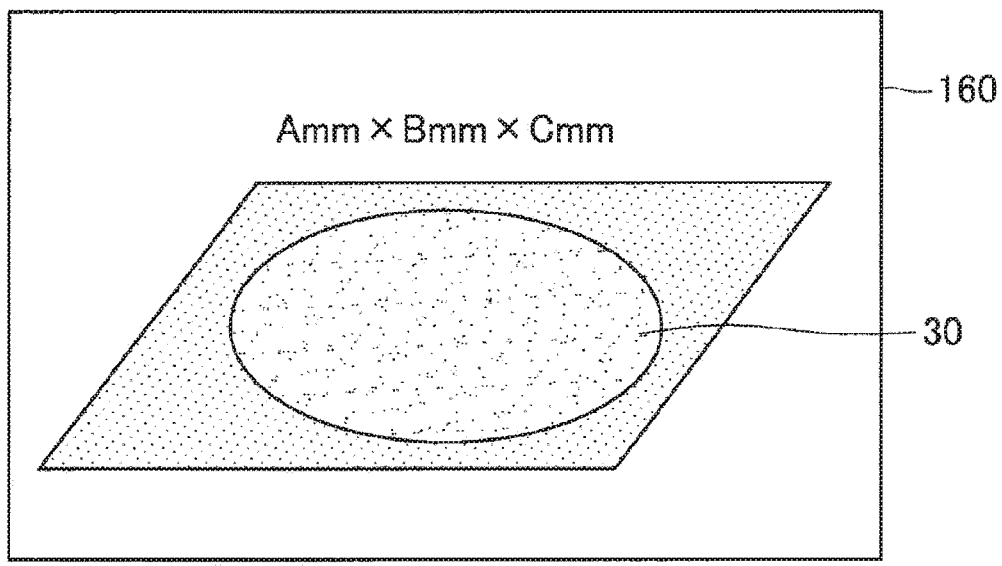
FIG. 18 is a diagram illustrating a first example of display of a subject area.

FIG. 18 is a diagram illustrating a first example of display of the subject area. As illustrated in FIG. 18, the display control unit 116 may perform display control so that the subject area (area where the subject 30 is present) and other areas (for example, a floor surface) are displayed in different colors. The colors of the subject area (area where the subject 30 is present) and other areas (for example, the floor surface) are not limited.

Figure 19:
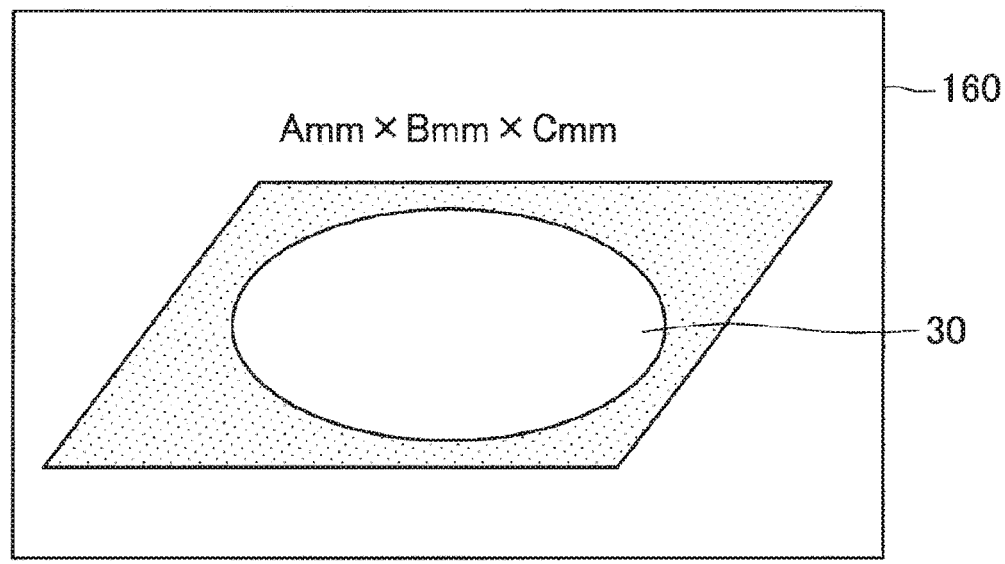
FIG. 19 is a diagram illustrating a second example of display of the subject area.

FIG. 19 is a diagram illustrating a second example of display of the subject area. As illustrated in FIG. 19, the display control unit 116 may perform display control so that the subject area (area where the subject 30 is present) and other areas (for example, a floor surface) are displayed in different brightness. For example, the display control unit 116 may perform display control so that the brightness of the subject area (area where the subject 30 is present) becomes higher than the brightness of other areas (for example, the floor surface).

1.2.8. Exemplary Configuration of Sensor

Subsequently, a configuration example of a sensor will be described. Although each of the depth information detecting unit 121 and the control unit 110 has been described above, in this example, at least a part of the depth information detecting unit 121 and the control unit 110 may be a laminated image sensor. For example, the laminated image sensor may be a TOF sensor. For example, the laminated image sensor may be a two-layer laminated image sensor.

Figure 20:
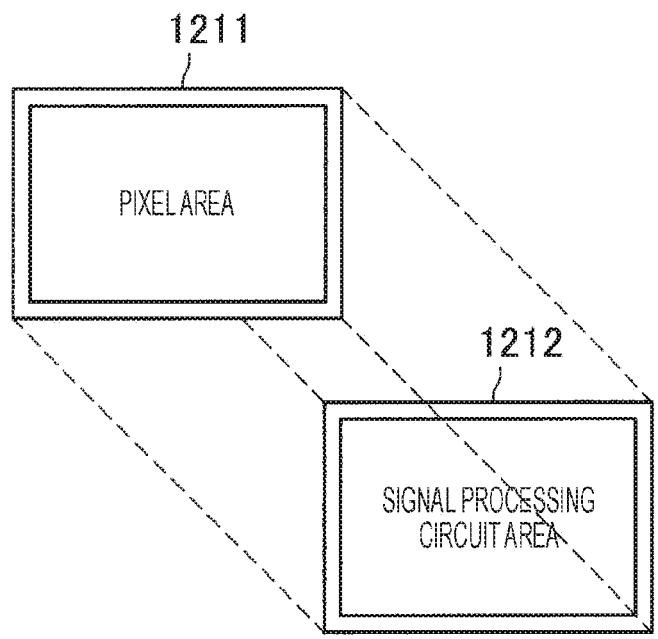
FIG. 20 is a diagram illustrating a configuration example of a two-layer laminated image sensor.
Figure 21:
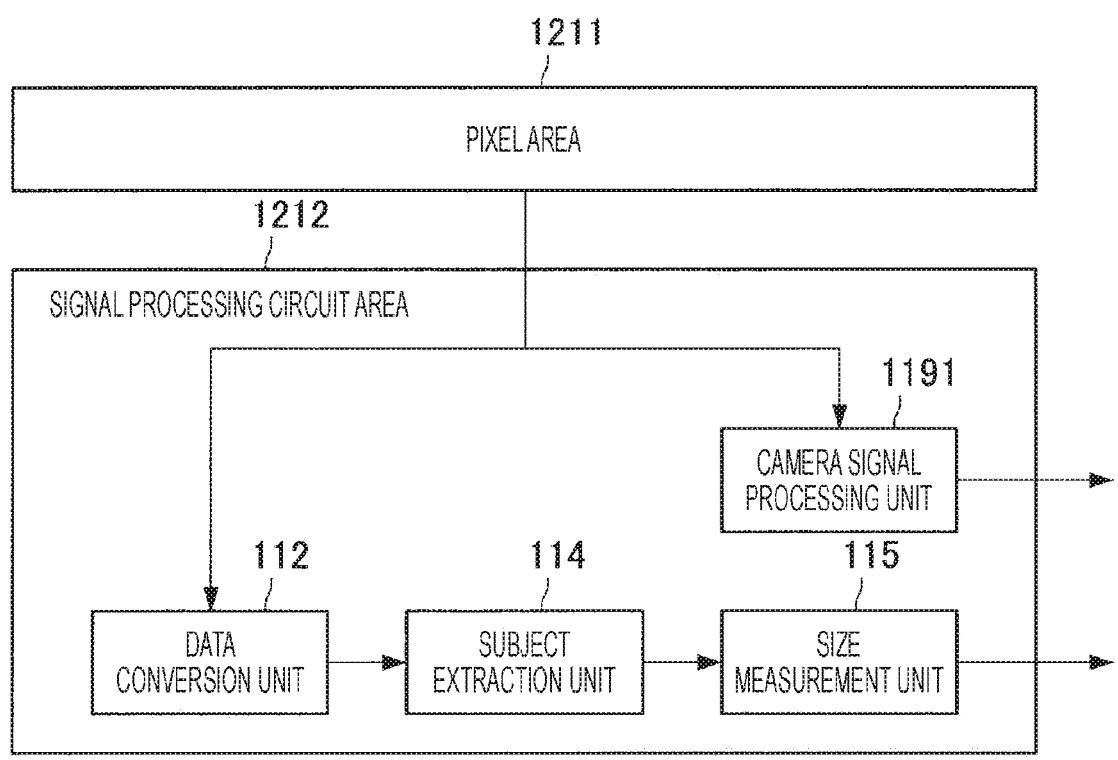
FIG. 21 is a diagram illustrating a detailed configuration example of the two-layer laminated image sensor.

FIG. 20 is a diagram illustrating a configuration example of a two-layer laminated image sensor. FIG. 21 is a diagram illustrating a detailed configuration example of the two-layer laminated image sensor. Referring to FIG. 20, a pixel area 1211 and a signal processing circuit area 1212 are laminated in the two-layer laminated image sensor. As illustrated in FIG. 21, the signal processing circuit area 1212 may further include the data conversion unit 112, the subject extraction unit 114, the size measurement unit 115, and a camera signal processing unit 1191. Note that the signal processing circuit area 1212 may further include other components included in the control unit 110.

Distance information for each pixel detected by the pixel area 1211 is output to the data conversion unit 112 and the camera signal processing unit 1191. As described above, the data conversion unit 112 converts the distance information for each pixel into three-dimensional data, the subject extraction unit 114 extracts a subject area on the basis of the three-dimensional data, and the size measurement unit 115 measures the size of the subject on the basis of the subject area and outputs the size of the subject. Meanwhile, the camera signal processing unit 1191 processes the distance information for each pixel and outputs the processed distance information as a displayable captured image.

Alternatively, the laminated image sensor may be a three-layer laminated image sensor.

Figure 22:
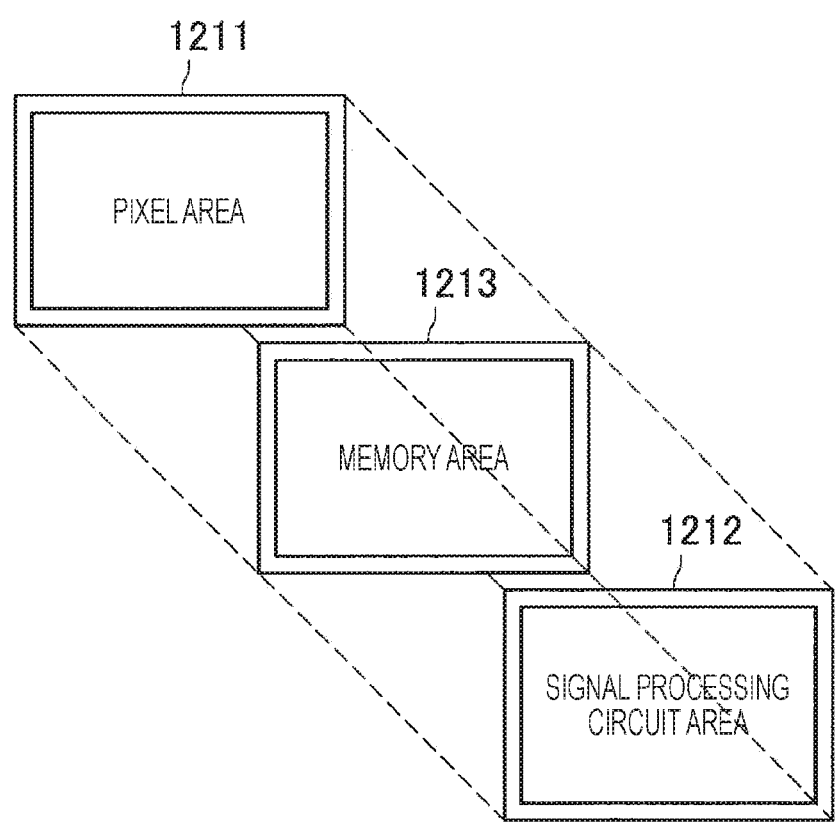
FIG. 22 is a diagram illustrating a configuration example of a three-layer laminated image sensor.
Figure 23:
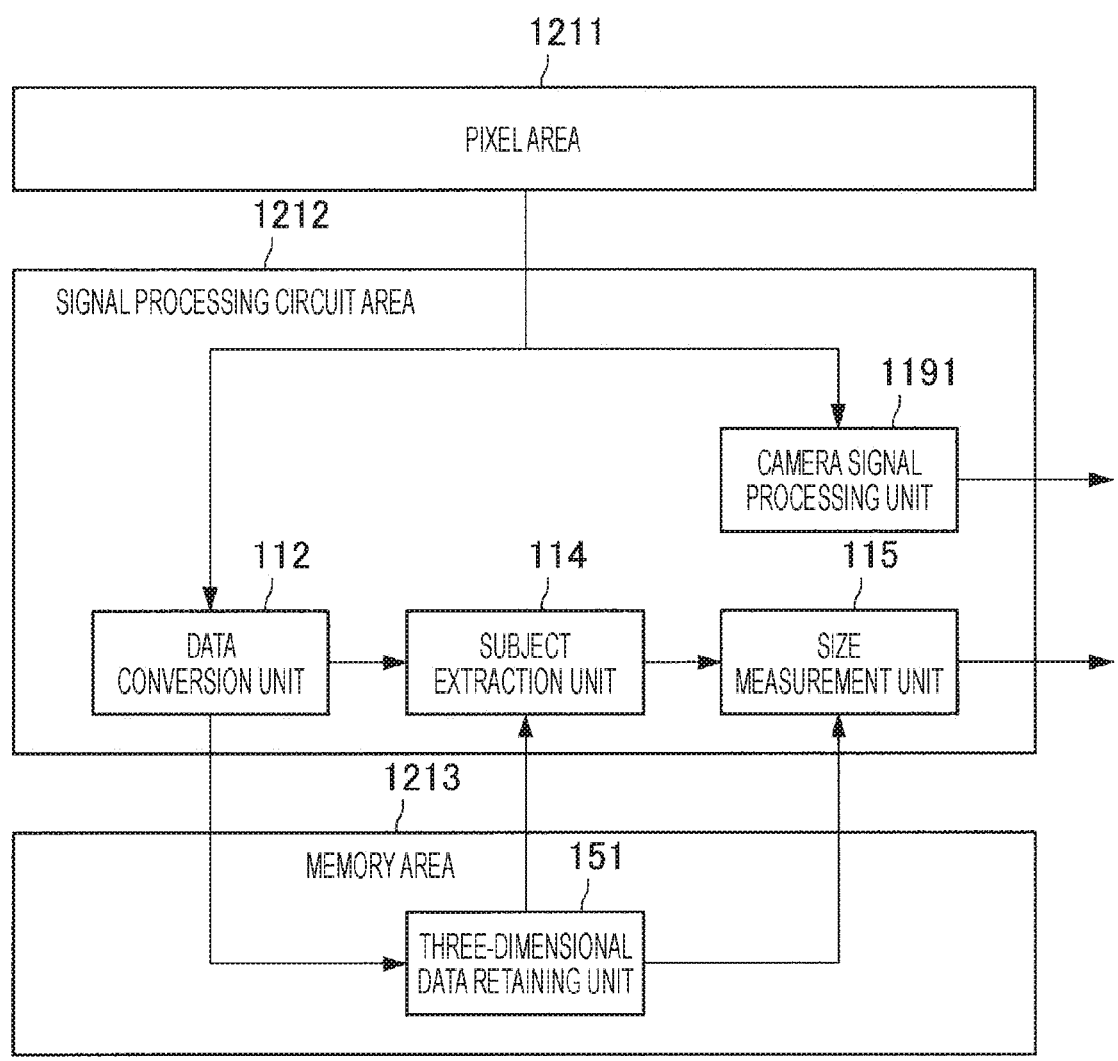
FIG. 23 is a diagram illustrating a detailed configuration example of the three-layer laminated image sensor.

FIG. 22 is a diagram illustrating a configuration example of a three-layer laminated image sensor. FIG. 23 is a diagram illustrating a detailed configuration example of the three-layer laminated image sensor. Referring to FIG. 22, a memory area is laminated in addition to the pixel area 1211 and the signal processing circuit area 1212 in the three-layer laminated image sensor. Moreover, a memory area 1213 may include a three-dimensional data retaining unit 151 for retaining the three-dimensional data obtained by the data conversion unit 112 as illustrated in FIG. 23.

The subject extraction unit 114 acquires three-dimensional data from the three-dimensional data retaining unit 151 and extracts a subject area on the basis of the acquired three-dimensional data. The size measurement unit 115 also acquires the three-dimensional data from the three-dimensional data retaining unit 151, and measures the size of the subject on the basis of the acquired three-dimensional data and information indicating the subject area extracted by the subject extraction unit 114 and outputs the size of the subject. Other configurations of the three-layer laminated image sensor are as described above with reference to FIGS. 21 and 22.

1.2.9. Multiple Subjects

In the above description, a case of measuring the size of one subject has been mainly described. However, the number of subjects to be measured is not particularly limited. For example, it is possible to measure the size of each of multiple subjects by performing the size measurement of one subject as described above on the multiple subjects. That is, the size measurement unit 115 can measure the size of each of multiple subjects on the basis of the plurality of subject areas in a case where a plurality of subject areas is extracted.

In this case, the display control unit 116 is only required to perform control so that predetermined display based on the size of each of the multiple subjects is displayed while superimposed on the captured image.

Figure 24:
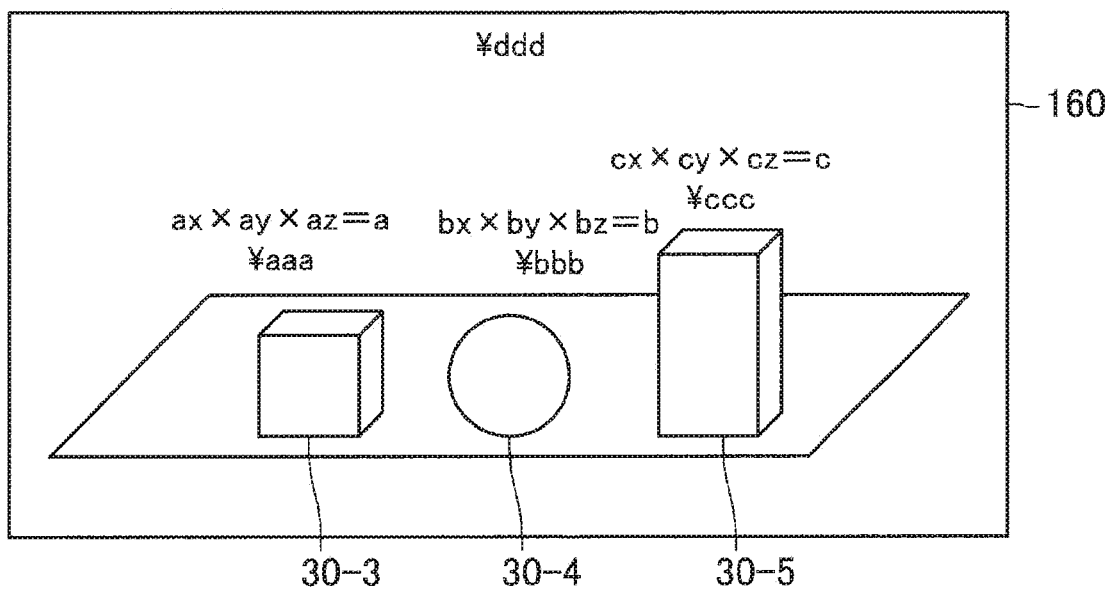
FIG. 24 is a diagram illustrating an example of predetermined display based on the size of each of multiple subjects.

FIG. 24 is a diagram illustrating an example of predetermined display based on the size of each of multiple subjects. Referring to FIG. 24, there is a plurality of subjects 30 in the coverage (screen). In particular, in the example illustrated in FIG. 24, a subject 30-3, a subject 30-4, and a subject 30-5 are present in the coverage (screen) (there are three subjects 30 in the coverage (screen)). However, the number of subjects 30 present in the coverage (screen) is not limited to three.

Referring to FIG. 24, as an example of display based on the size of the subject 30-3, the display control unit 116 performs control so that the size of the subject 30-3 "(length×width×height=) ax×ay×az", the total size "a" of the subject 30-3, and the price "¥ aaa" corresponding to the size of the subject 30-3 are displayed at a position corresponding to the position of the subject 30-3.

Referring to FIG. 24, as an example of display based on the size of the subject 30-4, the display control unit 116 also performs control so that the size of the subject 30-4 "(length×width×height=) bx×by×bz", the total size "b" of the subject 30-4, and the price "¥ bbb" corresponding to the size of the subject 30-4 are displayed at a position corresponding to the position of the subject 30-4.

Referring to FIG. 24, as an example of display based on the size of the subject 30-5, the display control unit 116 also performs control so that the size of the subject 30-5 "(length×width×height=) cx×cy×cz", the total size "c" of the subject 30-5, and the price "¥ ccc" corresponding to the size of the subject 30-5 are displayed at a position corresponding to the position of the subject 30-5.

Referring to FIG. 24, the display control unit 116 also performs control so that the total price "¥ ddd" of the price "¥ aaa" corresponding to the size of the subject 30-3, the price "¥ bbb" corresponding to the size of the subject 30-4, and the price "¥ ccc" corresponding to the size of the subject 30-5 is displayed.

Note that the display control unit 116 may control to perform other display based on the subject 30-3, the subject 30-4, and the subject 30-5.

For example, the display control unit 116 may control display over ranges on the screen corresponding to the sizes of the subject 30-3, the subject 30-4, and the subject 30-5. Alternatively, the display control unit 116 may control the display of the total of the sizes of the subject 30-3, the subject 30-4, and the subject 30-5. Alternatively, the display control unit 116 may control the display of six planes circumscribing each of the areas (subject areas) of the subject 30-3, the subject 30-4, and the subject 30-5.

1.2.10. Exemplary Operation

Figure 25:
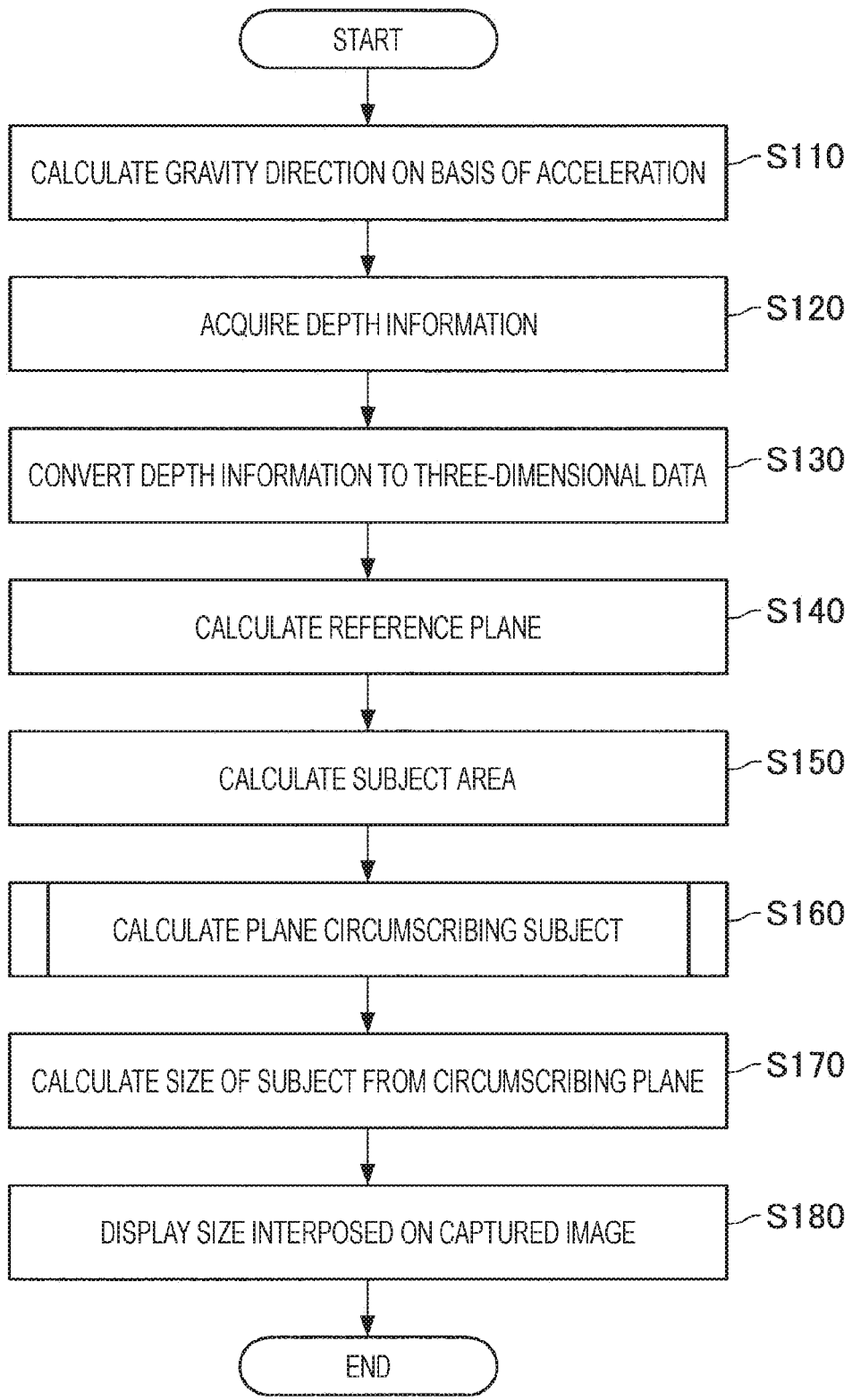
FIG. 25 is a flowchart illustrating exemplary operation of the information processing device according to the first embodiment of the present disclosure.

FIG. 25 is a flowchart illustrating exemplary operation of the information processing device 10A according to the first embodiment of the present disclosure. Note that the exemplary operation described in FIG. 25 is merely an example of the operation of the information processing device 10A according to the first embodiment of the present disclosure. Therefore, the operation of the information processing device 10A according to the first embodiment of the present disclosure is not limited to the operation described in FIG. 25.

As illustrated in FIG. 25, the acceleration acquiring unit 117 acquires the acceleration detected by the acceleration detecting unit 122. The gravity direction calculating unit 118 calculates the gravity direction on the basis of the acceleration acquired by the acceleration acquiring unit 117 (S110). Meanwhile, the depth information acquiring unit 111 acquires the depth information detected by the depth information detecting unit 121 (S120). The data conversion unit 112 converts the depth information acquired by the depth information acquiring unit 111 into three-dimensional data (S130).

The reference plane calculating unit 113 calculates a reference plane on the basis of the gravity direction calculated by the gravity direction calculating unit 118 (S140). The subject extraction unit 114 calculates a subject area on the basis of the three-dimensional data obtained by the data conversion unit 112 (S150). The size measurement unit 115 calculates planes that circumscribe the subject (for example, six planes) (S160). The calculation of planes circumscribing the subject will be described in detail with reference to FIG. 26.

Figure 26:
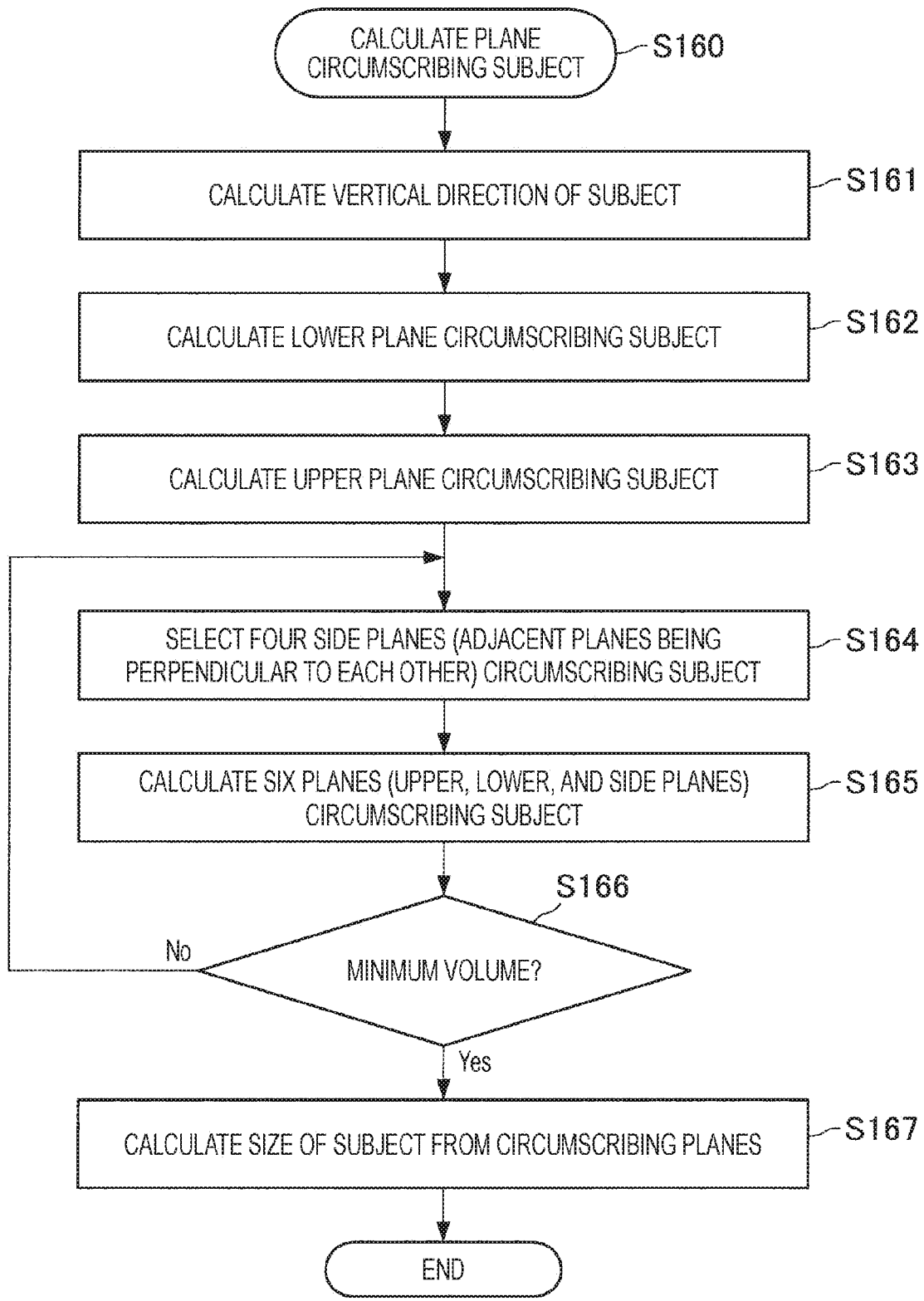
FIG. 26 is a flowchart illustrating detailed operation for calculating planes circumscribing a subject.

FIG. 26 is a flowchart illustrating detailed operation for calculating planes circumscribing a subject. Note that the exemplary operation described in FIG. 26 is merely an example of the operation for calculating planes circumscribing a subject. Therefore, the operation for calculating planes circumscribing the subject is not limited to the operation described in FIG. 26.

As described in FIG. 26, the size measurement unit 115 calculates the vertical direction of a subject (S161). Subsequently, the size measurement unit 115 calculates a plane (lower plane) circumscribing the bottom of the subject (S162), and calculates a plane (upper plane) circumscribing the top of the subject (S163). Then, the size measurement unit 115 selects four side planes (adjacent planes perpendicular to each other) that circumscribe the subject (S164), and calculates the volume of the six planes (upper plane, lower plane, and four side planes) that circumscribe the subject (S165).

Next, the size measurement unit 115 determines whether or not the calculated volume is the smallest (S166). If the calculated volume is not the smallest ("No" in S166), the size measurement unit 115 returns to S164. On the other hand, if the calculated volume is the smallest ("Yes" in S166), the size measurement unit 115 calculates the size of the subject from the circumscribing planes that give the smallest volume (S164).

Returning to FIG. 25, descriptions will be continued. When the calculation of planes circumscribing the subject is completed, the size measurement unit 115 calculates the size of the subject from the planes circumscribing the subject (S170). Then, the display control unit 116 controls the display unit 160 so that the size of the subject is displayed while superimposed on the captured image. The display unit 160 displays the size of the subject superimposed on the captured image in accordance with display control by the display control unit 116 (S180).

1.2.11. Obtaining Depth Information Multiple Times

The above description mainly assumes a case where the size of a subject is measured on the basis of depth information obtained by one time of imaging. However, there may be a case where the size of the subject cannot be measured with high accuracy only from the depth information obtained by one time of imaging. In such a case, it is preferable to obtain depth information a plurality of times and to measure the size of the subject on the basis of the depth information obtained for the plurality of times. Hereinafter, such a case will be described in detail.

Figure 27:
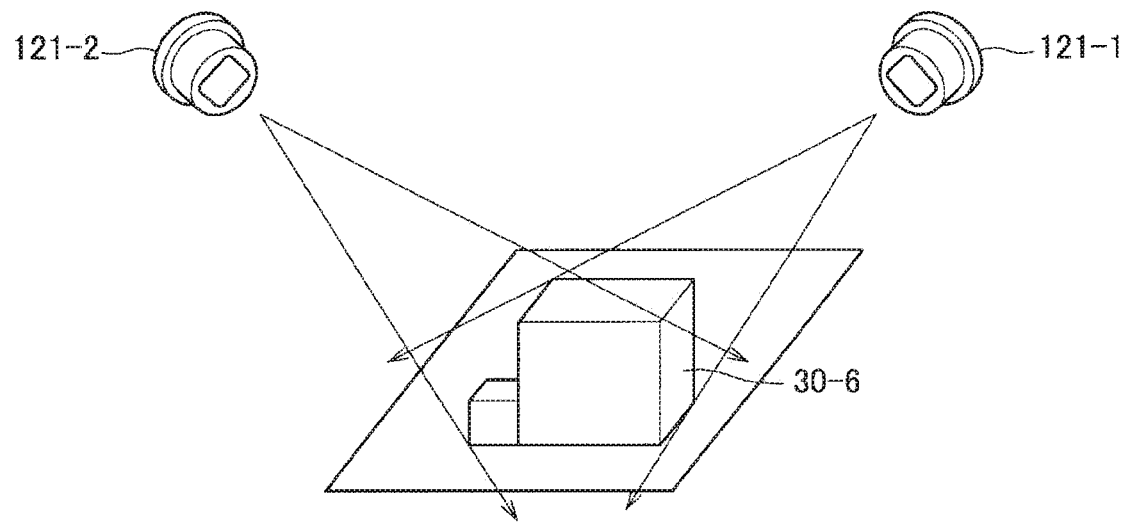
FIG. 27 is a diagram for explaining a first example of obtaining depth information a plurality of times.

FIG. 27 is a diagram for explaining a first example of obtaining depth information a plurality of times. Referring to FIG. 27, a depth information detecting unit 121-1 is illustrated at a position where the depth information detecting unit 121 performs first imaging. However, since the shape of the subject 30-6 is not simple, it is difficult to estimate the shape of a portion of the subject 30-6 that corresponds to a blind spot only from the range imaged by the depth information detecting unit 121-1.

Therefore, in such a case, it is preferable that the depth information detecting unit 121 perform imaging for the second time also. Referring to FIG. 27, a depth information detecting unit 121-2 is illustrated at a position where the depth information detecting unit 121 performs second imaging. The range captured by the depth information detecting unit 121-2 includes a portion that is not included in the range imaged by the depth information detecting unit 121-1.

Here, in the case where the depth information detected by each of the depth information detecting unit 121-1 and the depth information detecting unit 121-2 is acquired by the depth information acquiring unit 111 and the data conversion unit 112 acquires three-dimensional data corresponding to each piece of the depth information, the data conversion unit 112 is only required to combine the three-dimensional data of these pieces of depth information. Then, it is only required that the subject extraction unit 114 extract a subject area on the basis of the synthesized three-dimensional data.

Figure 28:
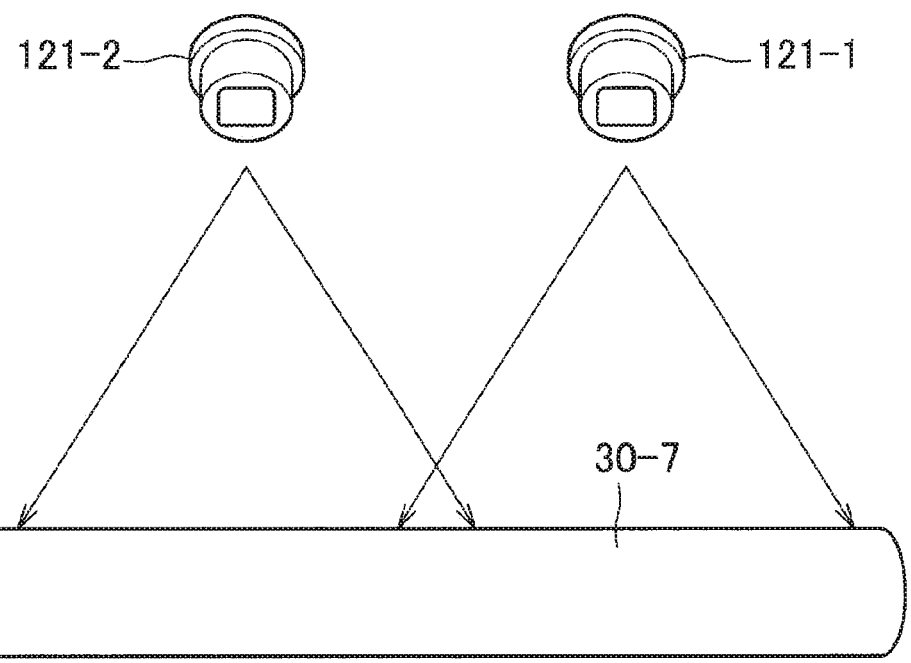
FIG. 28 is a diagram for explaining a second example of obtaining depth information a plurality of times.

FIG. 28 is a diagram for explaining a second example of obtaining depth information a plurality of times. Referring to FIG. 28, a depth information detecting unit 121-1 is illustrated at a position where the depth information detecting unit 121 performs first imaging. However, since a subject 30-7 is elongated, it is difficult to accommodate the entire subject 30-7 while maintaining a certain size of the subject 30-7 within the range imaged by the depth information detecting unit 121-1.

Therefore, in such a case, it is preferable that the depth information detecting unit 121 perform imaging for the second time also. Referring to FIG. 28, a depth information detecting unit 121-2 is illustrated at a position where the depth information detecting unit 121 performs second imaging. The range captured by the depth information detecting unit 121-2 includes a portion that is not included in the range imaged by the depth information detecting unit 121-1.

Here, in the case where the depth information detected by each of the depth information detecting unit 121-1 and the depth information detecting unit 121-2 is acquired by the depth information acquiring unit 111 and the data conversion unit 112 acquires three-dimensional data corresponding to each piece of the depth information, the data conversion unit 112 is only required to combine the three-dimensional data of these pieces of depth information. Then, it is only required that the subject extraction unit 114 extract a subject area on the basis of the synthesized three-dimensional data.

1.2.12. Exemplary Operation for Obtaining Depth Information Multiple Times

Figure 29:
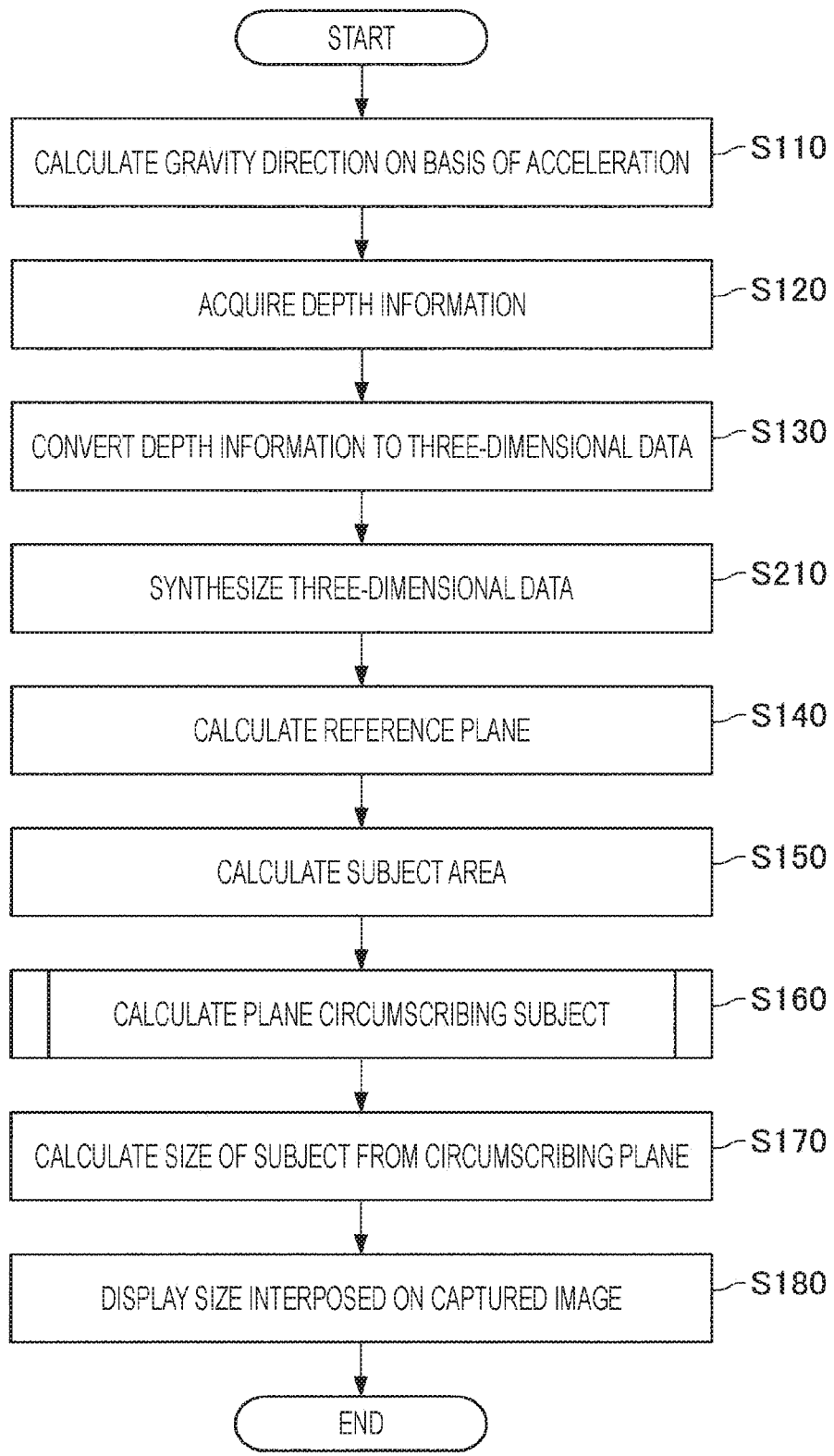
FIG. 29 is a flowchart illustrating exemplary operation of the information processing device according to the first embodiment of the present disclosure in a case where depth information is obtained a plurality of times.

FIG. 29 is a flowchart illustrating exemplary operation of the information processing device 10A according to the first embodiment of the present disclosure in a case where depth information is obtained a plurality of times. Note that the exemplary operation described in FIG. 29 is merely an example of the operation for obtaining depth information for a plurality of times. Therefore, the operation for obtaining depth information a plurality of times is not limited to the operation illustrated in FIG. 29.

As illustrated in FIG. 29, the acceleration acquiring unit 117 acquires the acceleration detected by the acceleration detecting unit 122. The gravity direction calculating unit 118 calculates the gravity direction on the basis of the acceleration acquired by the acceleration acquiring unit 117 (S110). Moreover, the depth information acquiring unit 111 acquires the depth information detected a plurality of times by the depth information detecting unit 121 (S120). The data conversion unit 112 converts each of the multiple pieces of depth information acquired by the depth information acquiring unit 111 into three-dimensional data (S130).

The data conversion unit 112 combines the three-dimensional data each corresponding to one of the multiple pieces of depth information (S210).

The reference plane calculating unit 113 calculates a reference plane on the basis of the gravity direction calculated by the gravity direction calculating unit 118 (S140). The subject extraction unit 114 calculates a subject area on the basis of the three-dimensional data obtained by the data conversion unit 112 (S150). The size measurement unit 115 calculates planes that circumscribe the subject (for example, six planes) (S160). The calculation of planes circumscribing the subject is as illustrated in FIG. 26.

When the calculation of planes circumscribing the subject is completed, the size measurement unit 115 calculates the size of the subject from the planes circumscribing the subject (S170). Then, the display control unit 116 controls the display unit 160 so that the size of the subject is displayed while superimposed on the captured image. The display unit 160 displays the size of the subject superimposed on the captured image in accordance with display control by the display control unit 116 (S180).

1.2.13. Summary of First Embodiment

According to the first embodiment of the present disclosure, provided is the information processing device 10A including: the depth information acquiring unit 111 for acquiring depth information; the data conversion unit 112 for converting the depth information into three-dimensional data; the subject extraction unit 114 for extracting a subject area where a subject is present on the basis of the three-dimensional data; and the size measurement unit 115 for measuring the size of the subject on the basis of the subject area, in which the size measurement unit 115 detects six planes circumscribing the subject area and measures the size of the subject on the basis of the six planes.

According to such a configuration, it becomes possible to automatically measure the size of a subject with a reduced number of frames of images required, relaxed restrictions on the coverage and light projection, and no limitation on the shape of the subject.

The first embodiment of the present disclosure has been described above.

2. Second Embodiment

Subsequently, a second embodiment of the present disclosure will be described.

2.1. Functional Configuration Example of Information Processing Device

Figure 30:
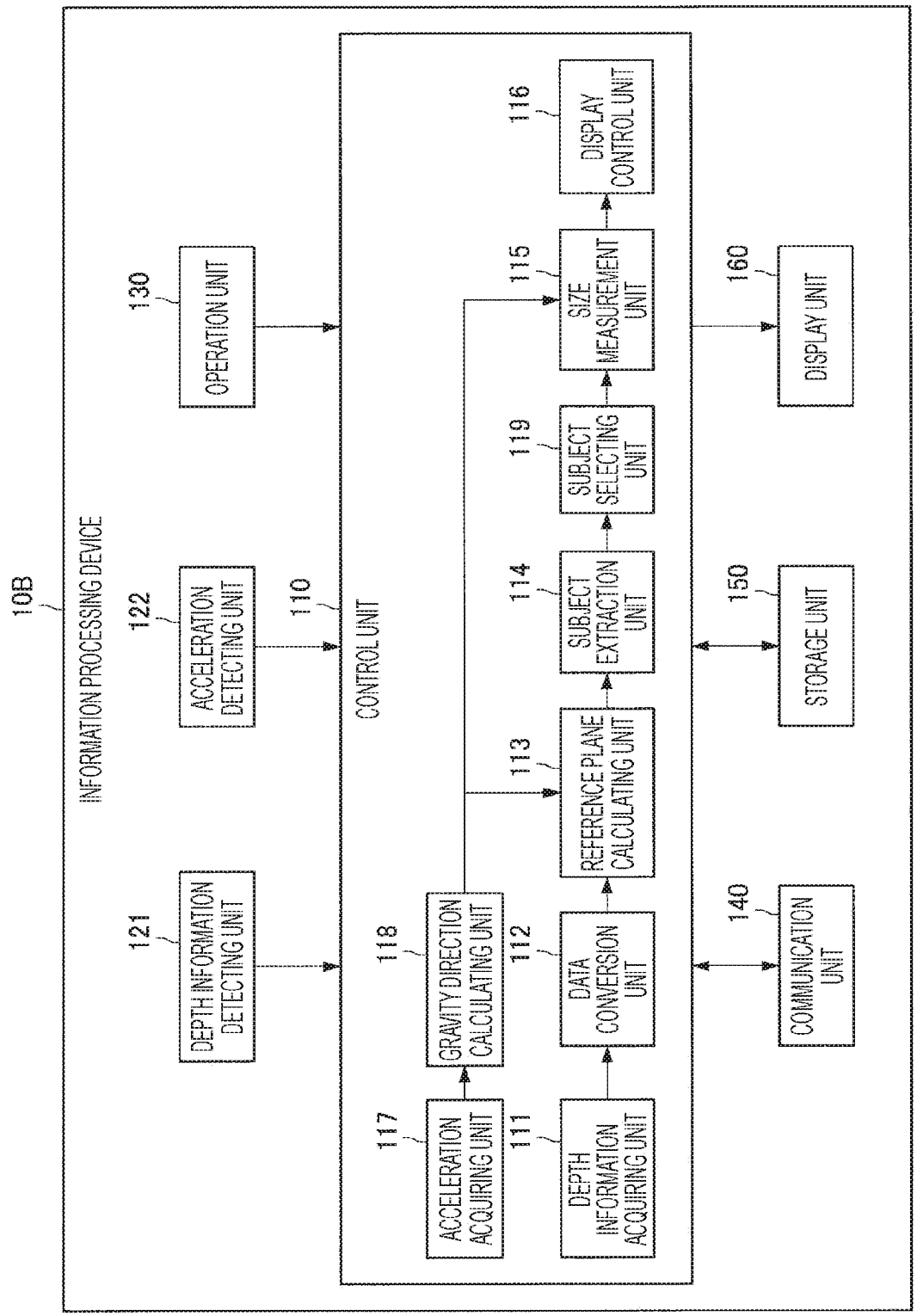
FIG. 30 is a block diagram illustrating a functional configuration example of an information processing device according to a second embodiment of the present disclosure.

Subsequently, a functional configuration example of an information processing device according to a second embodiment of the present disclosure will be described. FIG. 30 is a block diagram illustrating a functional configuration example of the information processing device according to the second embodiment of the present disclosure. As illustrated in FIG. 30, an information processing device 10B according to the second embodiment of the present disclosure includes a control unit 110, a depth information detecting unit 121, an acceleration detecting unit 122, an operation unit 130, a communication unit 140, a storage unit 150, and a display unit 160 like the information processing device 10A according to the first embodiment of the present disclosure.

However, the information processing device 10B according to the second embodiment of the present disclosure is mainly different from the information processing device 10A according to the first embodiment of the present disclosure in that the control unit 110 includes a subject selecting unit 119. Therefore, of the functions of the information processing device 10B, the function of the subject selecting unit 119 will be mainly described below, and detailed description of the other functions will be omitted.

The functional configuration example of the information processing device 10B according to the second embodiment of the present disclosure has been described above.

2.2. Detailed Functions of Information Processing Device

In the first embodiment of the present disclosure, a case where one subject area is extracted by the subject extraction unit 114 is mainly assumed. In the second embodiment of the present disclosure, a case where a plurality of subject areas is extracted by the subject extraction unit 114 is mainly assumed. In such a case, the subject selecting unit 119 is only required to select one subject from a plurality of subjects on the basis of user operation or automatically. It suffices that a size measurement unit 115 then measure the size of the selected one subject.

2.2.1. Automatic Subject Selection

Figure 31:
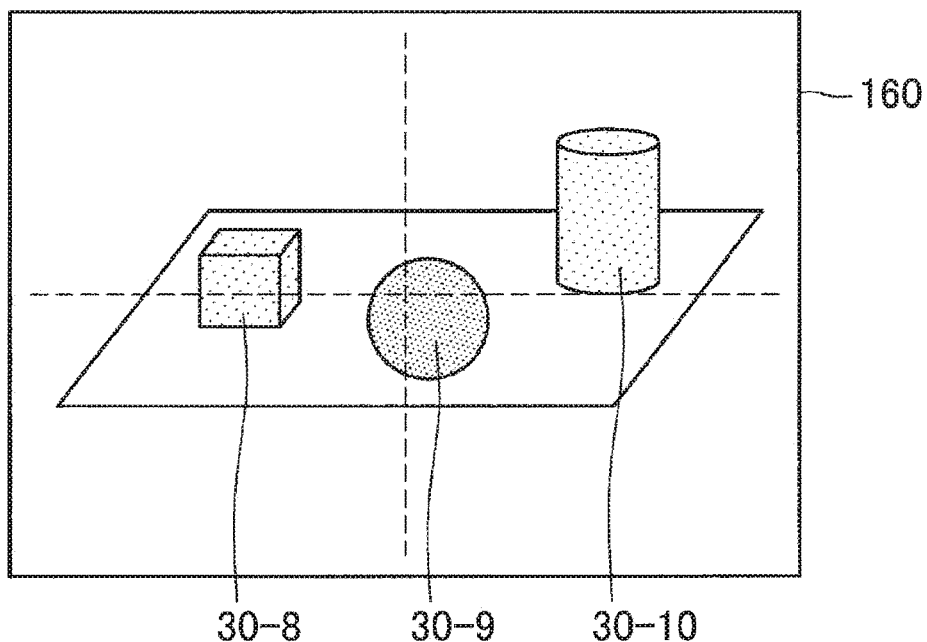
FIG. 31 is a diagram for explaining a first example in which one subject is automatically selected from a plurality of subjects.

FIG. 31 is a diagram for explaining a first example in which one subject is automatically selected from a plurality of subjects. Referring to FIG. 31, a subject 30-8, a subject 30-9, and a subject 30-10 are displayed by the display unit 160 as an example of a plurality of subjects 30 extracted by the subject extraction unit 114. Note that although three subjects 30 are extracted in the example illustrated in FIG. 31, the number of subjects 30 to be extracted is not limited to three.

In this case, it is possible that a subject to be measured is present at a position closest to the center of the coverage (screen) (closest to the optical axis of the depth information detecting unit 121). Therefore, the subject selecting unit 119 is only required to select a subject present at a position closest to the center of the coverage (screen). In the example illustrated in FIG. 31, since the subject 30-9 is present at a position closest to the center of the coverage (screen), it suffices that the subject selecting unit 119 select the subject 30-9.

Note that it is preferable that a selected subject, non-selected subjects, and an area other than the subjects are displayed in a distinguishable manner. That is, it is preferable that the display control unit 116 performs display control so that a subject area corresponding to the selected subject 30-9 and subject areas corresponding to the unselected subjects 30-8 and 30-10 can be distinguished and that the subject areas corresponding to the subject 30-8, the subject 30-9, and the subject 30-10 and other areas can be distinguished.

For example, as illustrated in FIG. 31, the display control unit 116 may perform display control so that the subject area corresponding to the selected subject 30-9 and the subject areas corresponding to the unselected subjects 30-8 and 30-10 are displayed in different colors. The color of each of the subject area corresponding to the selected subject 30-9 and the subject areas corresponding to the unselected subjects 30-8 and 30-10 is not limited.

Alternatively, the display control unit 116 may perform display control so that the subject area corresponding to the selected subject 30-9 and the subject areas corresponding to the unselected subjects 30-8 and 30-10 are displayed in different brightness. For example, the display control unit 116 may perform display control so that the brightness of the subject area corresponding to the selected subject 30-9 becomes brighter than the brightness of the subject areas corresponding to the unselected subjects 30-8 and 30-10.

Moreover, as illustrated in FIG. 31, the display control unit 116 may perform display control so that the subject areas corresponding to the subjects 30-8, 30-9, and 30-10 and the area other than the subjects are displayed in different colors. The color of each of the subject areas corresponding to the subjects 30-8, 30-9, and 30-10 and the area other than the subjects are not limited.

Alternatively, the display control unit 116 may perform display control so that the subject areas corresponding to the subjects 30-8, 30-9, and 30-10 and the area other than the subjects are displayed in different brightness. For example, the display control unit 116 may perform display control so that the brightness of the subject areas corresponding to the subjects 30-8, 30-9, and 30-10 becomes brighter than the brightness of the area other than the subjects.

Figure 32:
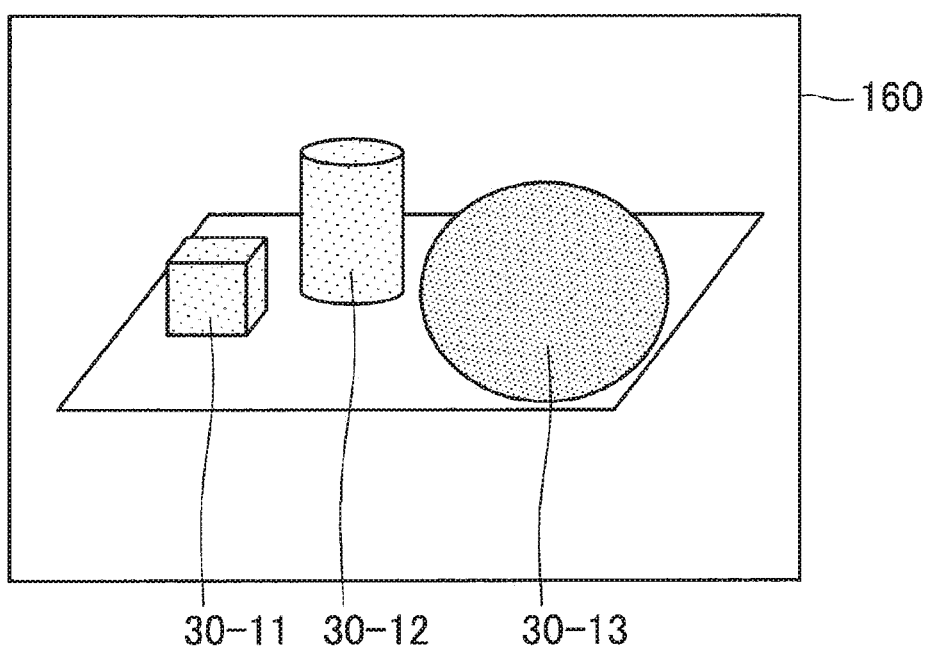
FIG. 32 is a diagram for explaining a second example in which one subject is automatically selected from a plurality of subjects.

FIG. 32 is a diagram for explaining a second example in which one subject is automatically selected from a plurality of subjects. Referring to FIG. 32, a subject 30-11, a subject 30-12, and a subject 30-13 are displayed by the display unit 160 as an example of a plurality of subjects 30 extracted by the subject extraction unit 114. Note that although three subjects 30 are extracted in the example illustrated in FIG. 32, the number of subjects 30 to be extracted is not limited to three.

In this case, there is a possibility that a subject to be measured has the highest occupancy rate in the coverage (screen). Therefore, the subject selecting unit 119 is only required to select a subject having the highest occupancy rate in the coverage (screen). In the example illustrated in FIG. 32, since the subject 30-13 has the highest occupancy rate in the coverage (screen), it suffices that the subject selecting unit 119 select the subject 30-13.

Figure 33:
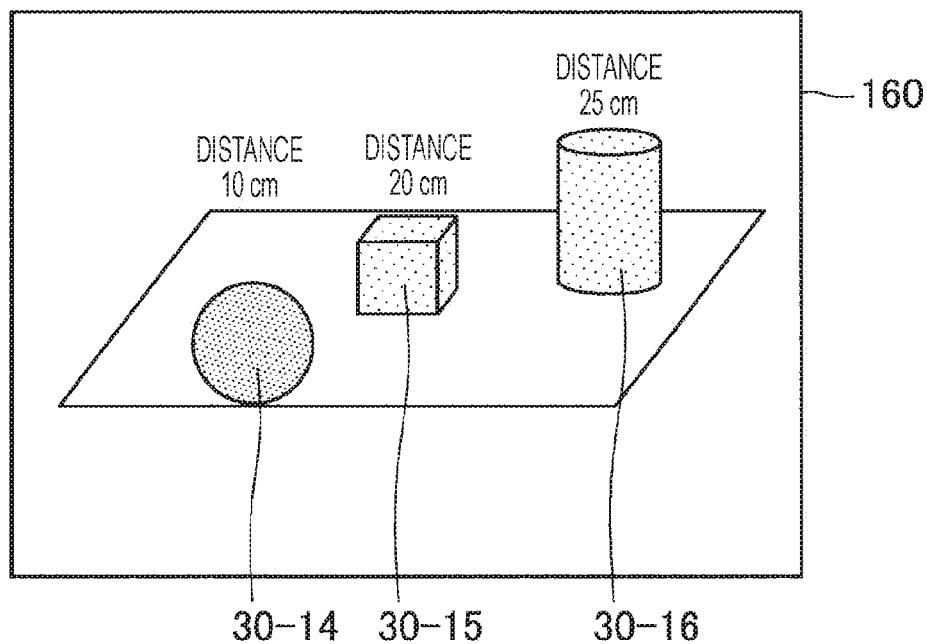
FIG. 33 is a diagram for explaining a third example in which one subject is automatically selected from a plurality of subjects.

FIG. 33 is a diagram for explaining a third example in which one subject is automatically selected from a plurality of subjects. Referring to FIG. 33, a subject 30-14, a subject 30-15, and a subject 30-16 are displayed by the display unit 160 as an example of a plurality of subjects 30 extracted by the subject extraction unit 114. Note that although three subjects 30 are extracted in the example illustrated in FIG. 33, the number of subjects 30 to be extracted is not limited to three.

In this case, there is a possibility that a subject to be measured is closest to the depth information detecting unit 121. Therefore, the subject selecting unit 119 is only required to select a subject that is closest to the depth information detecting unit 121 on the basis of depth information. In the example illustrated in FIG. 33, since the subject 30-14 is closest to the depth information detecting unit 121, it suffices that the subject selecting unit 119 select the subject 30-14.

Figure 34:
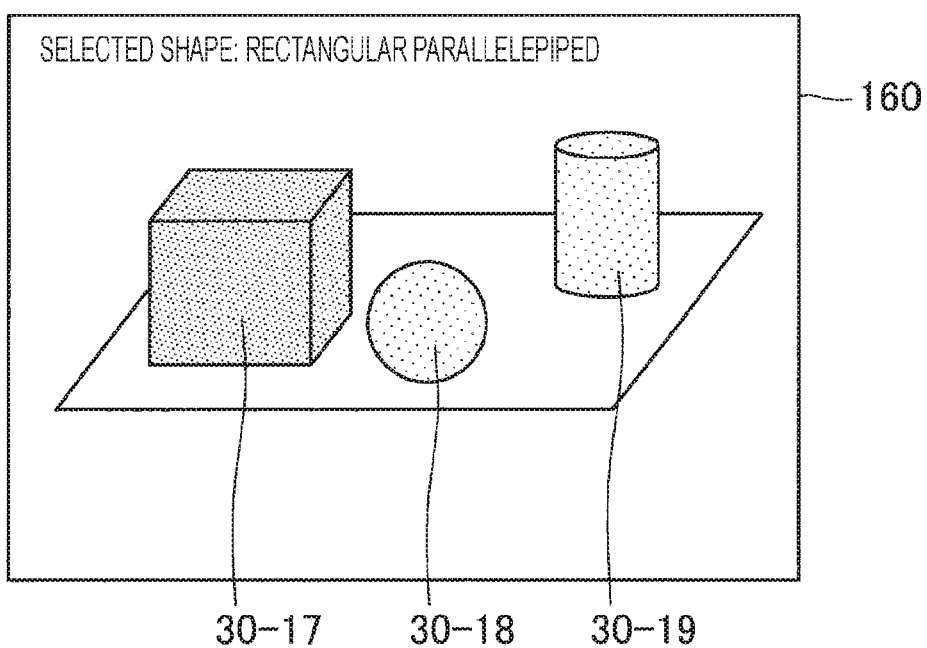
FIG. 34 is a diagram for explaining a fourth example in which one subject is automatically selected from a plurality of subjects.

FIG. 34 is a diagram for explaining a fourth example in which one subject is automatically selected from a plurality of subjects. Referring to FIG. 34, a subject 30-17, a subject 30-18, and a subject 30-19 are displayed by the display unit 160 as an example of a plurality of subjects 30 extracted by the subject extraction unit 114. Note that although three subjects 30 are extracted in the example illustrated in FIG. 34, the number of subjects 30 to be extracted is not limited to three.

For example, in a case where the shape of a subject to be selected is registered in advance, it is preferable that the subject selecting unit 119 select a subject having the shape having been registered in advance. In the example illustrated in FIG. 34, since the "rectangular parallelepiped" is registered in advance as the shape of a subject to be selected, it suffices that the subject selecting unit 119 select the subject 30-17 having a rectangular parallelepiped shape.

2.2.2. Subject Selection Based on User Operation

Figure 35:
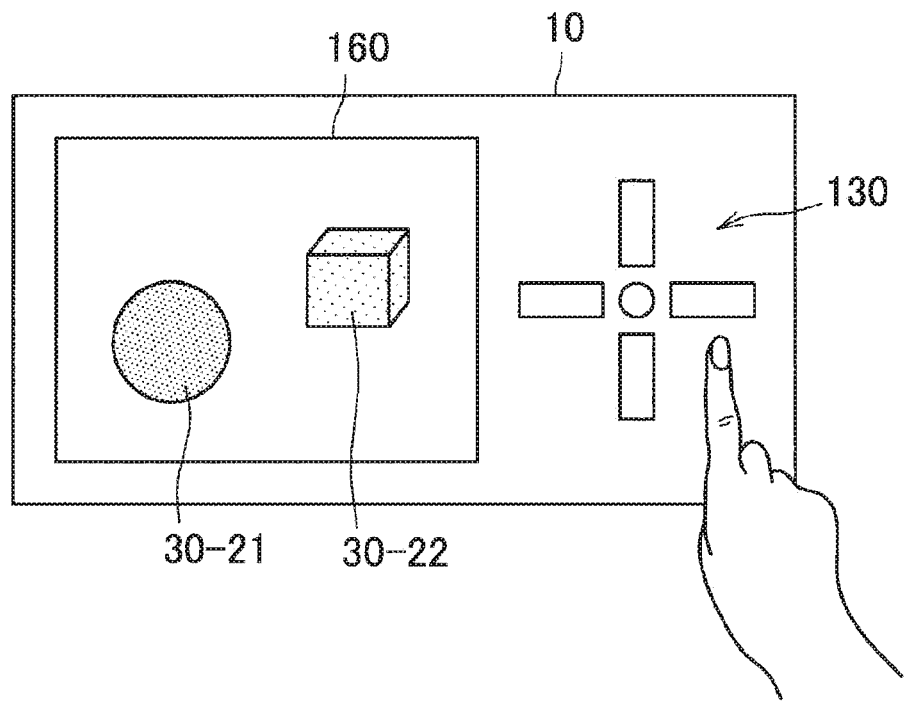
FIG. 35 is a diagram for explaining a first example in which one subject is selected from a plurality of subjects on the basis of user operation.

FIG. 35 is a diagram for explaining a first example in which one subject is selected from a plurality of subjects on the basis of user operation. Referring to FIG. 35, a subject 30-21 and a subject 30-22 are displayed by the display unit 160 as an example of a plurality of subjects 30 extracted by the subject extraction unit 114. Note that although two subjects 30 are extracted in the example illustrated in FIG. 35, the number of subjects 30 to be extracted is not limited to two.

For example in a case where the operation unit 130 includes buttons as illustrated in FIG. 35, it is preferable that the subject selecting unit 119 select a subject on the basis of a button pressed by a user. In the example illustrated in FIG. 35, since the button indicating the left is pressed by the user, it suffices that the subject selecting unit 119 select the subject 30-21 present on the left side.

Figure 36:
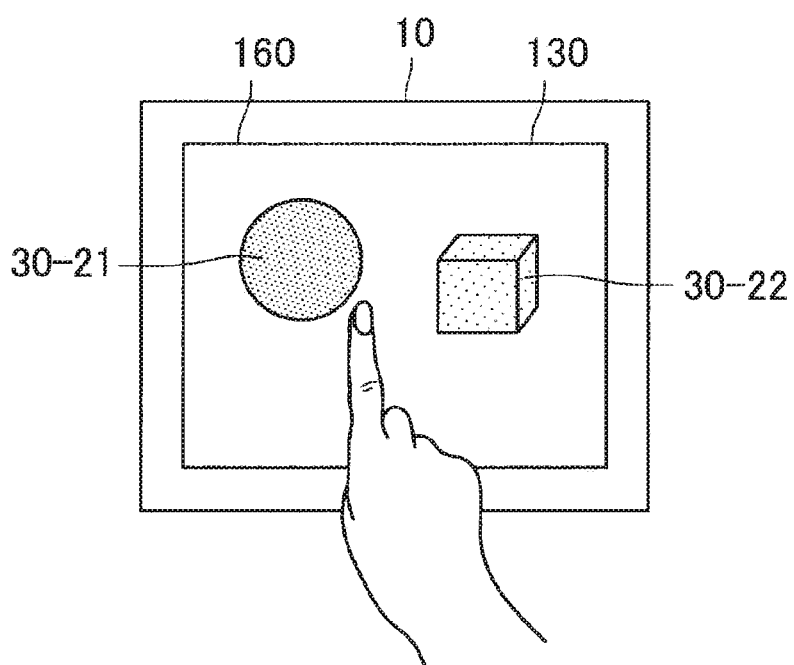
FIG. 36 is a diagram for explaining a second example in which one subject is selected from a plurality of subjects on the basis of user operation.

FIG. 36 is a diagram for explaining a second example in which one subject is selected from a plurality of subjects on the basis of user operation. Referring to FIG. 36, the subject 30-21 and the subject 30-22 are displayed by the display unit 160 as an example of a plurality of subjects 30 extracted by the subject extraction unit 114. Note that although two subjects 30 are extracted in the example illustrated in FIG. 36, the number of subjects 30 to be extracted is not limited to two.

For example in a case where the operation unit 130 includes a touch panel as illustrated in FIG. 36, it is preferable that the subject selecting unit 119 select a subject on the basis of a position touched by a user. In the example illustrated in FIG. 36, since the position where the subject 30-21 is displayed is touched by the user, it suffices that the subject selecting unit 119 select the subject 30-21 presenting at the position touched by the user.

2.2.3. Exemplary Operation for Selecting Subject

Figure 37:
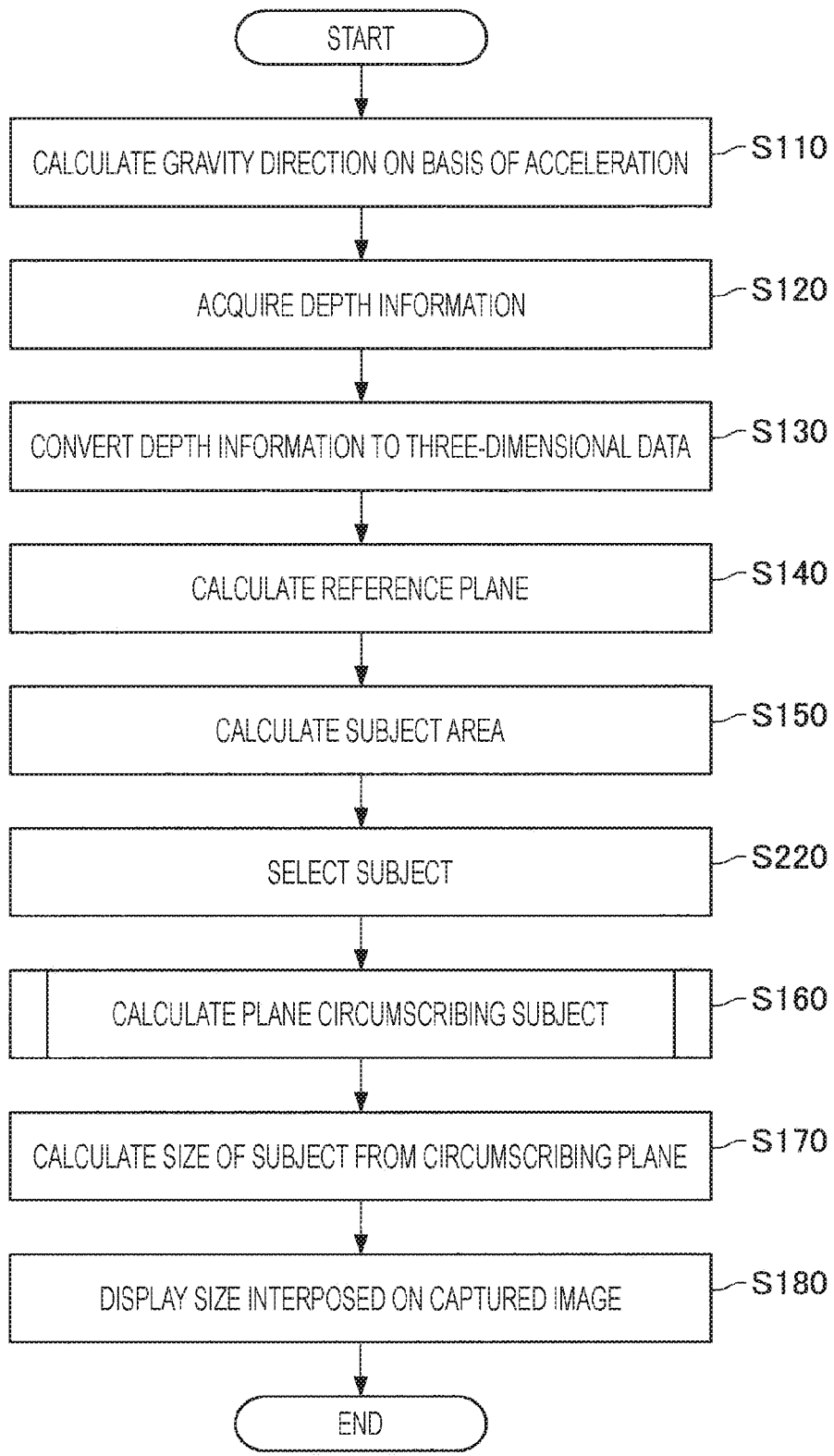
FIG. 37 is a flowchart illustrating exemplary operation of the information processing device according to the second embodiment of the present disclosure in a case of selecting a subject.

FIG. 37 is a flowchart illustrating exemplary operation of the information processing device 10B according to the second embodiment of the present disclosure in a case of selecting a subject. Note that the exemplary operation described in FIG. 37 is merely an example of the operation for selecting a subject. Therefore, the operation for selecting a subject is not limited to the operation described in FIG. 37.

As illustrated in FIG. 37, the acceleration acquiring unit 117 acquires the acceleration detected by the acceleration detecting unit 122. The gravity direction calculating unit 118 calculates the gravity direction on the basis of the acceleration acquired by the acceleration acquiring unit 117 (S110). Meanwhile, the depth information acquiring unit 111 acquires the depth information detected by the depth information detecting unit 121 (S120). The data conversion unit 112 converts the depth information acquired by the depth information acquiring unit 111 into three-dimensional data (S130).

The reference plane calculating unit 113 calculates a reference plane on the basis of the gravity direction calculated by the gravity direction calculating unit 118 (S140). The subject extraction unit 114 calculates a plurality of subject areas on the basis of the three-dimensional data obtained by the data conversion unit 112 (S150). The subject selecting unit 119 selects one subject from a plurality of subjects (S220). The size measurement unit 115 calculates planes that circumscribe the subject (for example, six planes) (S160). The calculation of planes circumscribing the subject is as illustrated in FIG. 26.

When the calculation of planes circumscribing the subject is completed, the size measurement unit 115 calculates the size of the subject from the planes circumscribing the subject (S170). Then, the display control unit 116 controls the display unit 160 so that the size of the subject is displayed while superimposed on the captured image. The display unit 160 displays the size of the subject superimposed on the captured image in accordance with display control by the display control unit 116 (S180).

2.2.4. Summary of Second Embodiment

According to the second embodiment of the present disclosure, the information processing device 10B is provided which is obtained by further adding, to the information processing device 10B according to the first embodiment, the subject selecting unit 119 for selecting one subject is from a plurality of subjects on the basis of user operation or automatically. Then, the size measurement unit 115 measures the size of one subject selected by the subject selecting unit 119.

According to such a configuration, it becomes possible to automatically measure the size of a subject with a reduced number of frames of images required, relaxed restrictions on the coverage and light projection, and no limitation on the shape of the subject, like in the first embodiment. Furthermore, according to such a configuration, even if a plurality of subjects is extracted, it becomes possible to select a desired subject from the plurality of subjects and to measure the size of the selected subject.

The second embodiment of the present disclosure has been described above.

3. Exemplary Hardware Configuration

Figure 38:
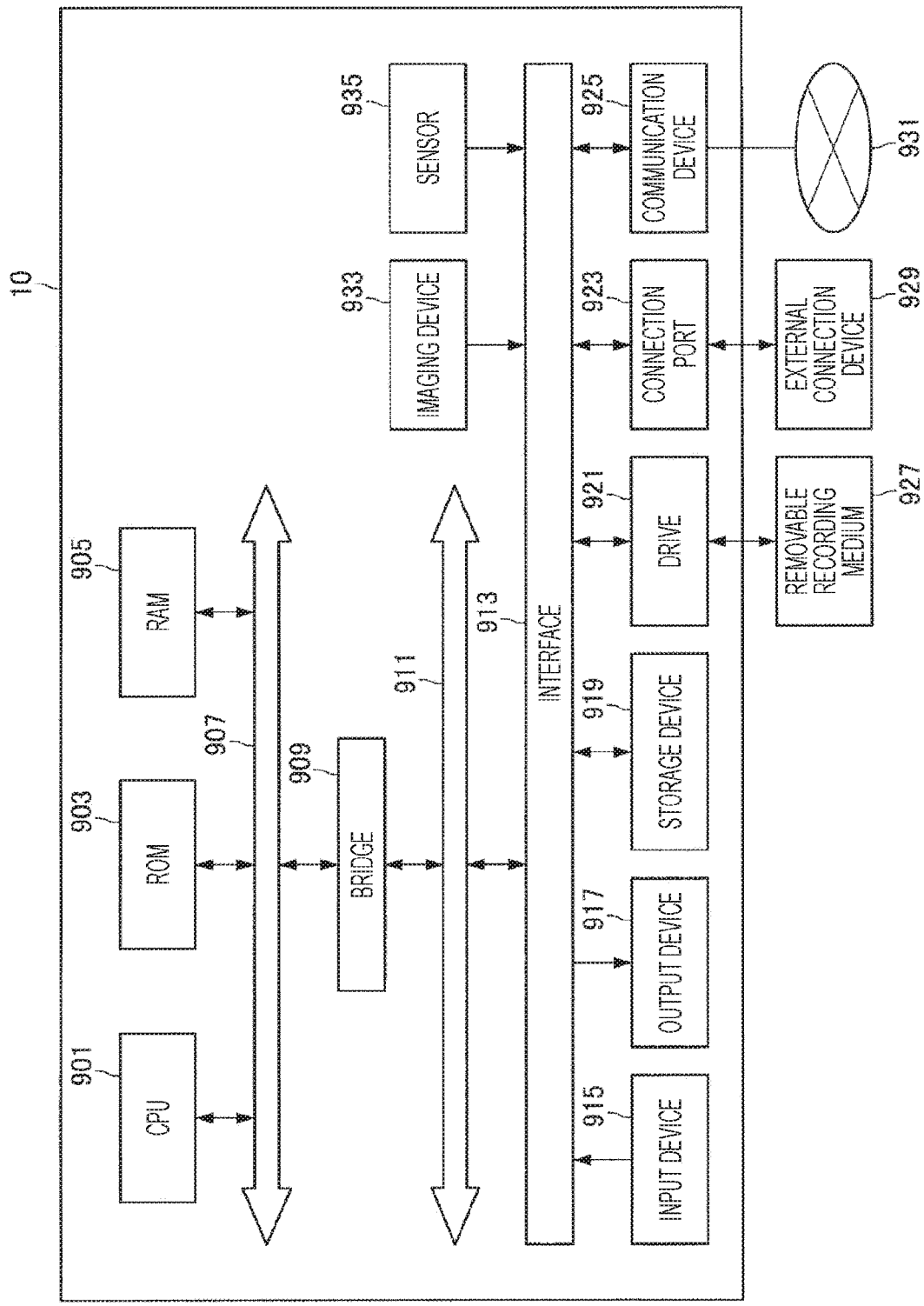
FIG. 38 is a block diagram illustrating an exemplary hardware configuration of the information processing device according to the embodiment of the present disclosure.

Next, the hardware configuration of the information processing device 10 according to the embodiment of the present disclosure will be described with reference to FIG. 38. FIG. 38 is a block diagram illustrating an exemplary hardware configuration of the information processing device 10 according to the embodiment of the present disclosure.

As illustrated in FIG. 38, the information processing device 10 includes a central processing unit (CPU) 901, a read only memory (ROM) 903, and a random access memory (RAM) 905. The information processing device 10 may further include a host bus 907, a bridge 909, an external bus 911, an interface 913, an input device 915, an output device 917, a storage device 919, a drive 921, a connection port 923, and a communication device 925. The information processing device 10 may further include an imaging device 933 and a sensor 935 as necessary. The information processing device 10 include a processing circuit such as a digital signal processor (DSP) or an application specific integrated circuit (ASIC) in place of or in addition to the CPU 901.

The CPU 901 functions as an arithmetic processing device and a control device, and controls the entire or a part of the operation in the information processing device 10 according to various programs recorded in the ROM 903, the RAM 905, the storage device 919, or a removable recording medium 927. The ROM 903 stores programs, arithmetic operation parameters, or the like used by the CPU 901. The RAM 905 temporarily stores programs used for execution by the CPU 901, parameters that change as appropriate during the execution, and the like. The CPU 901, the ROM 903, and the RAM 905 are connected to each other by the host bus 907 including an internal bus such as a CPU bus. The host bus 907 is further connected to the external bus 911 such as a peripheral component interconnect/interface (PCI) bus via the bridge 909.

The input device 915 is a device operated by a user such as a button. The input device 915 may include a mouse, a keyboard, a touch panel, a switch, a lever, or the like. The input device 915 may also include a microphone that detects the user's voice. The input device 915 may be, for example, a remote control device using infrared rays or other radio waves, or may be an external connection device 929 such as a mobile phone compatible with the operation of the information processing device 10. The input device 915 includes an input control circuit that generates an input signal on the basis of information input by the user and outputs the input signal to the CPU 901. The user operates the input device 915 to input various types of data to the information processing device 10 or instruct processing operation. In addition, the imaging device 933 as described later can also function as an input device by imaging the motion of the hand or the finger of the user, and the like. In this case, a pointed position may be determined depending on the motion of the hand or the direction of the finger.

The output device 917 includes a device capable of visually or aurally notifying the user of the acquired information. The output device 917 may be, for example, a display device such as a liquid crystal display (LCD) or an organic electro-luminescence (EL) display, or a sound output device such as a speaker or headphones. The output device 917 may also include a plasma display panel (PDP), a projector, a hologram, or a printer device. The output device 917 outputs a result obtained by processing by the information processing device 10 as a picture such as a text or an image, or as sound such as voice or acoustic sound. The output device 917 may further include a light or the like to brighten the surroundings.

The storage device 919 is a device for storing data configured as an example of a storage unit of the information processing device 10. The storage device 919 includes, for example, a magnetic storage device such as a hard disk drive (HDD), a semiconductor storage device, an optical storage device, or a magneto-optical storage device. The storage device 919 stores programs to be executed by the CPU 901, various types of data, various types of data acquired externally, or the like.

The drive 921 is a reader/writer for the removable recording medium 927 such as a magnetic disk, an optical disk, a magneto-optical disk, or a semiconductor memory, and is built in or externally attached to the information processing device 10. The drive 921 reads out information recorded in the mounted removable recording medium 927 and outputs the information to the RAM 905. The drive 921 also writes a record into the mounted removable recording medium 927.

The connection port 923 is a port for directly connecting a device to the information processing device 10. The connection port 923 may be, for example, a universal serial bus (USB) port, an IEEE 1394 port, a small computer system interface (SCSI) port, or the like. In addition, the connection port 923 may be an RS-232C port, an optical audio terminal, a high-definition multimedia interface (HDMI) (registered trademark) port, or the like. By connecting the external connection device 929 to the connection port 923, various types of data can be exchanged between the information processing device 10 and the external connection device 929.

The communication device 925 is a communication interface including a communication device for connection with a network 931, for example. The communication device 925 may be, for example, a communication card for a wired or wireless local area network (LAN), Bluetooth (registered trademark), or a wireless USB (WUSB). The communication device 925 may also be a router for optical communication, a router for an asymmetric digital subscriber line (ADSL), or a modem for various types of communication. The communication device 925 transmits and receives signals and the like to and from the Internet or another communication device using a predetermined protocol such as TCP/IP. In addition, the network 931 connected to the communication device 925 is a network connected in a wired or wireless manner, such as the Internet, a home LAN, infrared communication, radio wave communication, or satellite communication.

The imaging device 933 is a device which images the real space using various members, such as an imaging element such as a charge coupled device (CCD) or a complementary metal oxide semiconductor (CMOS) or a lens for controlling the formation of a subject image on the imaging device, and generates a captured image. The imaging device 933 may capture a still image, or may capture a video.

The sensor 935 includes various sensors such as a ranging sensor, an acceleration sensor, a gyro sensor, a geomagnetic sensor, a vibration sensor, an optical sensor, or a sound sensor. The sensor 935 acquires information regarding the state of the information processing device 10 itself, such as the attitude of a casing of the information processing device 10 or information regarding the surrounding environment of the information processing device 10, such as the brightness or the noise around the information processing device 10. The sensor 935 may also include a GPS sensor that receives global positioning system (GPS) signals to measure the latitude, the longitude, and the altitude of the device.

4. Conclusion

The preferred embodiments of the present disclosure have been described in detail with reference to the accompanying drawings; however, the technical scope of the present disclosure is not limited to such examples. It is clear that a person having ordinary knowledge in the technical field of the present disclosure can conceive various variations or modifications within the scope of the technical idea described in the claims, and it is understood that these variations or modifications also naturally belong to the technical scope of the present disclosure.

In addition, the effects described herein are merely illustrative or exemplary, and not limiting. That is, the technology according to the present disclosure may exert other effects apparent to those skilled in the art from the description of the present specification, together with or in place of the above effects.

Note that the following configurations are also within the technical scope of the present disclosure.

(1)

An information processing device including:
a depth information acquiring unit configured to acquire depth information;
a data conversion unit configured to convert the depth information into three-dimensional data;
a subject extraction unit configured to extract a subject area where a subject is present on the basis of the three-dimensional data; and a size measurement unit configured to measure a size of the subject on the basis of the subject area, in which the size measurement unit detects six planes circumscribing the subject area and measures the size of the subject on the basis of the six planes.

(2)

The information processing device according to the item (1),
in which the size measurement unit measures a distance between each of three pairs of parallel planes facing each other as the size of the subject.

(3)

The information processing device according to the item (1) or (2),
in which the size measurement unit detects a plurality of combinations of six planes circumscribing the subject area, detects six planes having a smallest enclosed volume among the plurality of combinations of six planes, and measures the size of the subject on the basis of the six planes having the smallest volume.

(4)

The information processing device according to any one of items (1) to (3),
in which the size measurement unit detects, as an upper plane, a plane circumscribing a top of the subject area out of two planes perpendicular to a vertical direction and circumscribing the subject area, detects, as a lower plane, a plane circumscribing a bottom of the subject area, and calculates four side planes perpendicular to the upper plane, the four side planes including two pairs of parallel planes facing each other.

(5)

The information processing device according to the item (4),
in which the size measurement unit detects, as the vertical direction, a gravity direction or a normal direction of a plane on which the subject is present.

(6)

The information processing device according to any one of the items (1) to (5),
in which the subject extraction unit extracts, as the subject area, on the basis of the three-dimensional data, at least one of an object area within a predetermined distance from a center of a screen, an object area having a screen occupancy rate larger than a predetermined rate, an object area closest to a sensor that detects the depth information, or an object area having a predetermined shape.

(7)

The information processing device according to any one of the items (1) to (6), further including:
a reference plane calculating unit configured to calculate a reference plane,
in which the subject extraction unit extracts an object area present on the reference plane as the subject area on the basis of the three-dimensional data.

(8)

The information processing device according to the item (7),
in which the reference plane calculating unit detects the reference plane on the basis of a gravity direction, detects a plane having a largest occupancy rate on a screen as the reference plane on the basis of the three-dimensional data, or detects, as the reference plane, a plane having a longer distance from a sensor that detects the depth information among a plurality of planes having matching or similar normal directions.

(9)

The information processing device according to any one of the items (1) to (8), further including:
a display control unit configured to perform control so that predetermined display based on the size of the subject is displayed while superimposed on a captured image,
in which the predetermined display includes at least one of the size of the subject, a range on a screen corresponding to the size of the subject, six planes circumscribing the subject area, a total size of the subject, or a price corresponding to the size of the subject.

(10)

The information processing device according to the item (9),
in which the captured image is an image captured by a sensor that detects the depth information, or an image captured by an image sensor that is different from the sensor that detects the depth information.

(11)

The information processing device according to the item (9) or (10),
in which the display control unit performs display control so that the subject area and another area can be distinguished.

(12)

The information processing device according to any one of the items (1) to (11), in which the size measurement unit measures a size of each of multiple subjects on the basis of a plurality of subject areas in a case where the plurality of subject areas is extracted.

(13)

The information processing device according to the item (12), further including:

a display control unit configured to perform control so that predetermined display based on the size of each of the multiple subjects is displayed while superimposed on a captured image, in which the predetermined display includes at least one of the size of each of the multiple subjects, a range on a screen corresponding to the size of each of the multiple subjects, six planes circumscribing each of the multiple subject areas, a total size of each of the multiple subjects, or a sum of prices corresponding to the respective sizes of the multiple subjects.

(14)

The information processing device according to the item (13), in which the display control unit performs display control so that, among the subject areas corresponding to the plurality of subjects, a subject area corresponding to the selected one subject and a subject area corresponding to another unselected subject can be distinguished, and performs display control so that the subject areas corresponding to the plurality of subjects and another area can be distinguished.

(15)

The information processing device according to the item (13) or (14), further including:

a subject selecting unit configured to select one subject from the plurality of subjects on the basis of user operation or automatically, in which the size measurement unit measures a size of the selected one subject.

(16)

The information processing device according to any one of the items (1) to (15), in which the depth information acquiring unit acquires the depth information detected by at least one of a TOF sensor, a distance image sensor supporting a structured light method, or a stereo camera.

(17)

The information processing device according to any one of the items (1) to (16), in which a sensor that detects the depth information is arranged at a position where at least an upper plane of the subject can be detected.

(18)

The information processing device according to any one of the items (1) to (17), in which the data conversion unit combines three-dimensional data corresponding to each of multiple pieces of depth information in a case where the multiple pieces of depth information are obtained and the three-dimensional data corresponding to each of the multiple pieces of depth information is obtained, and the subject extraction unit extracts the subject area on the basis of the combined three-dimensional data.

(19)

An information processing method including:

acquiring depth information;

converting the depth information into three-dimensional data;

extracting a subject area where a subject is present on the basis of the three-dimensional data; and measuring a size of the subject on the basis of the subject area, in which a processor detects six planes circumscribing the subject area and measures the size of the subject on the basis of the six planes.

(20)

An individual imaging device including:

a depth information acquiring unit configured to acquire depth information;

a data conversion unit configured to convert the depth information into three-dimensional data;

a subject extraction unit configured to extract a subject area where a subject is present on the basis of the three-dimensional data; and a size measurement unit configured to measure a size of the subject on the basis of the subject area, in which the size measurement unit detects six planes circumscribing the subject area and measures the size of the subject on the basis of the six planes.

REFERENCE SIGNS LIST (10A, 10B) Information processing device
30 Subject
40 Plane
51 Normal direction
52 Gravity direction
110 Control unit
111 Depth information acquiring unit
112 Data conversion unit
113 Reference plane calculating unit
114 Subject extraction unit
115 Size measurement unit
116 Display control unit
117 Acceleration acquiring unit
118 Gravity direction calculating unit
119 Subject selecting unit
121 Depth information detecting unit
122 Acceleration detecting unit
130 Operation unit
140 Communication unit
150 Storage unit
151 Three-dimensional data retaining unit
160 Display unit

The invention claimed is:

1. An information processing device comprising:
a processor configured to:
acquire depth information;
convert the depth information into three-dimensional data;
extract a subject area where a subject is present, wherein the extraction of the subject area is based on the three-dimensional data;
detect a plurality of combinations of six planes that circumscribe the extracted subject area;
determine six planes from the plurality of combinations of six planes that have a volume closest to a volume of the subject; and
measure a size of the subject based on the subject area and the determined six planes.

2. The information processing device according to claim 1, wherein the processor is configured to measure a distance between each of three pairs of parallel planes facing each other among the determined six planes as the size of the subject.

3. The information processing device according to claim 1, wherein the processor is further configured to:
   detect the six planes having a smallest enclosed volume among the plurality of combinations of six planes; and
   measure the size of the subject based on the six planes having the smallest enclosed volume.

4. The information processing device according to claim 1, wherein the processor is further configured to:
   detect, as an upper plane, a plane circumscribing a top of the subject area out of two planes perpendicular to a vertical direction and circumscribing the subject area;
   detect, as a lower plane, a plane circumscribing a bottom of the subject area; and
   calculate four side planes perpendicular to the upper plane, wherein the four side planes include two pairs of parallel planes facing each other.

5. The information processing device according to claim 4, wherein the processor is further configured to detect, as the vertical direction, one of a gravity direction or a normal direction of a plane on which the subject is present.

6. The information processing device according to claim 1, wherein the processor is configured to extract, as the subject area, based on the three-dimensional data, at least one of an object area within a determined distance from a center of a screen, an object area having a screen occupancy rate larger than a determined rate, an object area closest to a sensor that detects the depth information, or an object area having a determined shape.

7. The information processing device according to claim 1, wherein the processor is further configured to:
   calculate a reference plane; and
   extract an object area present on the reference plane as the subject area based on the three-dimensional data.

8. The information processing device according to claim 7, wherein the processor is further configured to:
   detect the reference plane based on a gravity direction;
   detect a plane having a largest occupancy rate on a screen as the reference plane based on the three-dimensional data; or
   detect, as the reference plane, a plane having a longer distance from a sensor that detects the depth information among a plurality of planes having matching or similar normal directions.

9. The information processing device according to claim 1, wherein
   the processor is further configured to control display of a determined display based on the size of the subject while superimposed on a captured image, and
   the determined display includes at least one of the size of the subject, a range on a screen corresponding to the size of the subject, the six planes circumscribing the subject area, a total size of the subject, or a price corresponding to the size of the subject.

10. The information processing device according to claim 9, wherein
    the captured image is an image captured by a sensor configured to detect the depth information, or an image captured by an image sensor, and
    the image sensor is different from the sensor that detects the depth information.

11. The information processing device according to claim 9, wherein the processor is further configured to control the display so that the subject area is distinguishable from another area.

12. The information processing device according to claim 1, wherein the processor is further configured to measure a size of each of multiple subjects based on a plurality of subject areas in a case where the plurality of subject areas is extracted.

13. The information processing device according to claim 12, wherein
    the processor is further configured to control display of a determined display based on the size of each of the multiple subjects while superimposed on a captured image, and
    the determined display includes at least one of the size of each of the multiple subjects, a range on a screen corresponding to the size of each of the multiple subjects, the six planes circumscribing each of the plurality of subject areas, a total size of each of the multiple subjects, or a sum of prices corresponding to respective sizes of the multiple subjects.

14. The information processing device according to claim 13, wherein the processor is further configured to:
    control the display so that, among the plurality of subject areas corresponding to the multiple subjects, a first subject area corresponding to a selected one subject is distinguishable from a second subject area corresponding to another unselected subject; and
    control the display so that the plurality of subject areas corresponding to the multiple subjects is distinguishable from another area.

15. The information processing device according to claim 13, wherein the processor is further configured to:
    select one subject from the multiple subjects based on one of a user operation or automatically; and
    measure the size of the selected one subject.

16. The information processing device according to claim 1, wherein the processor is further configured to acquire the depth information detected by at least one of a time of flight (TOF) sensor, a distance image sensor supporting a structured light method, or a stereo camera.

17. The information processing device according to claim 1, further comprising a sensor configured to detect the depth information arranged at a position where at least an upper plane of the subject is detected.

18. The information processing device according to claim 1, wherein the processor is further configured to:
    combine the three-dimensional data corresponding to each of multiple pieces of depth information in a case where the multiple pieces of depth information are obtained and the three-dimensional data corresponding to each of the multiple pieces of depth information is obtained; and
    extract the subject area based on the combined three-dimensional data.

19. An information processing method, comprising:
    acquiring depth information;
    converting the depth information into three-dimensional data;
    extracting a subject area where a subject is present, wherein the extraction of the subject area is based on the three-dimensional data;
    detecting a plurality of combinations of six planes that circumscribe the extracted subject area;

determining six planes from the plurality of combinations of six planes that have a volume closest to a volume of the subject; and measuring a size of the subject based on the subject area and the determined six planes.

20. An imaging device, comprising:

a processor configured to:
   acquire depth information;
   convert the depth information into three-dimensional data;
   extract a subject area where a subject is present, wherein the extraction of the subject area is based on the three-dimensional data;
   detect a plurality of combinations of six planes that circumscribe the extracted subject area;
   determine six planes from the plurality of combinations of six planes that have a volume closest to a volume of the subject; and
   measure a size of the subject based on the subject area and the determined six planes.

21. An information processing device comprising:

a processor configured to:
   acquire depth information;
   convert the depth information into three-dimensional data;
   extract a subject area where a subject is present, wherein the extraction of the subject area is based on the three-dimensional data;
   detect a plurality of combinations of six planes that circumscribe the subject area;
   detect six planes having a smallest enclosed volume among the plurality of combinations of six planes; and
   measure a size of the subject based on the six planes having the smallest enclosed volume.

* * * * *